United States Patent
Song

(10) Patent No.: US 9,942,660 B2
(45) Date of Patent: Apr. 10, 2018

(54) SOUND OUTPUT DEVICE

(71) Applicant: LG ELECTRONICS INC., Seoul (KR)

(72) Inventor: Jingon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/102,390

(22) PCT Filed: Nov. 13, 2014

(86) PCT No.: PCT/KR2014/010922
§ 371 (c)(1),
(2) Date: Jun. 7, 2016

(87) PCT Pub. No.: WO2015/088149
PCT Pub. Date: Jun. 18, 2015

(65) Prior Publication Data
US 2017/0019735 A1    Jan. 19, 2017

(30) Foreign Application Priority Data

Dec. 9, 2013 (KR) .......................... 10-2013-0152625

(51) Int. Cl.
*H04R 5/02* (2006.01)
*H04R 5/04* (2006.01)
(Continued)

(52) U.S. Cl.
CPC .............. *H04R 5/02* (2013.01); *G06F 3/165* (2013.01); *H04R 5/04* (2013.01); *H04R 27/00* (2013.01);
(Continued)

(58) Field of Classification Search
CPC .......................................................... H04R 5/02
See application file for complete search history.

(56) References Cited

U.S. PATENT DOCUMENTS

| 2007/0025555 A1* | 2/2007 | Gonai ..................... H04R 5/04 381/17 |
| 2008/0187155 A1* | 8/2008 | Hou ......................... H04R 1/02 381/300 |
| 2014/0341404 A1* | 11/2014 | Choisel ................. H04S 5/005 381/307 |

FOREIGN PATENT DOCUMENTS

| JP | 2006-033077 A | 2/2006 |
| JP | 2006-166362 A | 6/2006 |

(Continued)

OTHER PUBLICATIONS

International Search Report (with English Translation) and Written Opinion dated Feb. 17, 2015 issued in Application No. PCT/KR2014/010922.

*Primary Examiner* — Matthew Eason
*Assistant Examiner* — Phan Le
(74) *Attorney, Agent, or Firm* — KED & Associates LLP

(57) ABSTRACT

A sound output device according to the present invention comprises a plurality of sub-sound outputting devices which are combined with or separated from each other and are connected to each other electrically or through a short range communication network; and a controller being mounted in one of the plurality of sub-sound outputting devices. The controller can determine the type of a sound channel to realize based on how the plurality of sub-sound outputting devices are combined and disposed and determine the roles of the plurality of sub-sound outputting devices in the determined sound channel.

12 Claims, 31 Drawing Sheets

(51) Int. Cl.
  *H04R 27/00* (2006.01)
  *H04S 3/00* (2006.01)
  *G06F 3/16* (2006.01)
  *H04S 7/00* (2006.01)
  *H04S 1/00* (2006.01)

(52) U.S. Cl.
  CPC .............. *H04S 3/008* (2013.01); *H04S 7/301* (2013.01); *H04S 7/302* (2013.01); *H04R 2227/003* (2013.01); *H04R 2420/07* (2013.01); *H04S 1/007* (2013.01)

(56) References Cited

FOREIGN PATENT DOCUMENTS

| | | | |
|---|---|---|---|
| JP | 2008-277942 A | 11/2008 | |
| JP | 2010-118838 A | 5/2010 | |
| KR | 10-2004-0108733 A | 12/2004 | |

\* cited by examiner

Implementation of a 3.1 sound channel

Implement a 5.1 sound channel in conjunction with TV

FIG. 26
Dispose of sub-sound outputting devices
(a) 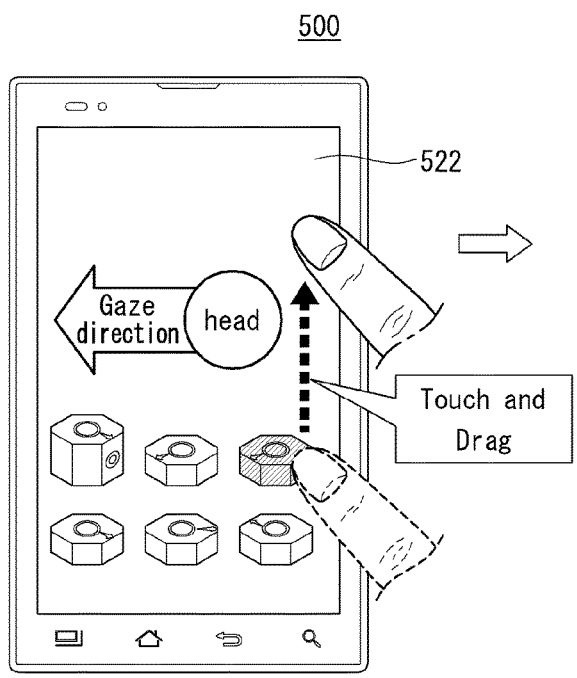
(b) 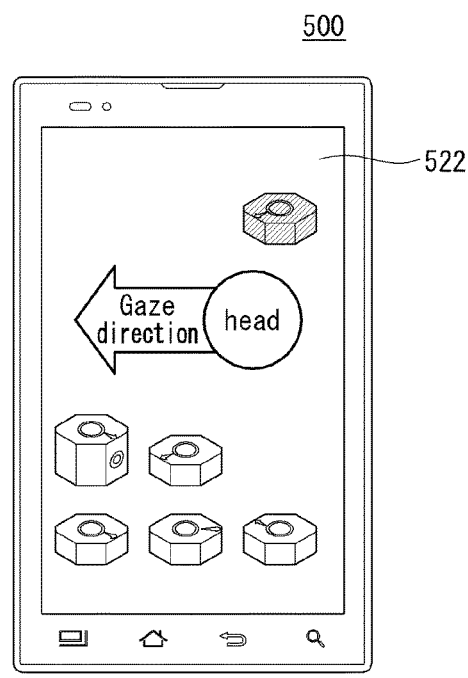

Change sound directions of sub-sound outputting devices

Sound field effect of sub-sound outputting devices

500

SOUND OUTPUT DEVICE

CROSS-REFERENCE TO RELATED PATENT APPLICATIONS

This application is a U.S. National Stage Application under 35 U.S.C. § 371 of PCT Application No. PCT/KR2014/010922, filed Nov. 13, 2014, which claims priority to Korean Patent Application No. 10-2013-0152625, filed Dec. 9, 2013, whose entire disclosures are hereby incorporated by reference.

TECHNICAL FIELD

The present invention is related to a sound output device and more specifically, a sound output device including a plurality of sub-sound outputting devices that can be combined with or separated from each other.

BACKGROUND ART

A sound output device (namely a speaker), being linked to other electronic devices and producing a sound output, takes a variable form, structure, and size depending on its intended use. For example, a sound output device designed for producing a bass sound and a sound output device designed for producing a high-pitched sound can have the respective forms, structures, and sizes. Owing to the recent boom in the outdoor sports, portable sound output devices are getting great attention from the public.

SUMMARY OF INVENTION

Technical Problem

Therefore, an objective of the present invention is to provide a sound output device capable of providing a three-dimensional (3D) sound along a direction desired by a user.

Another objective of the present invention is to provide a sound output device capable of implementing various types of sound channels by using a plurality of combinable/separable sub-sound outputting devices A yet another objective of the present invention is to provide a sound output device capable of performing a sound-related control function in association with various electronic devices.

Technical objects of the present invention are not limited to those objects described above; other technical objects not mentioned above can be clearly understood from what are described below by those skilled in the art to which the present invention belongs.

Technical Solution

To solve the technical problems above, a sound output device according to the present invention can comprise a plurality of sub-sound outputting devices which can be combined with or separated from each other and can be connected to each other electrically or through a short range communication network; and a controller. The controller can be mounted in one of the plurality of sub-sound outputting devices, determine the type of sound channel to realize based on how the plurality of sub-sound outputting devices are combined and disposed, and determine the roles of the plurality of sub-sound outputting devices in the determined sound channel.

The controller can determine the roles of the plurality of sub-sound outputting devices in the determined sound channel on the basis of the respective sound directions of the plurality of sub-sound outputting devices combined with each other.

The plurality of sub-sound outputting devices can be connected to each other electrically or through a short range communication network.

In case a different sound output device that can be coupled with the sound output device is connected electrically or through a short range wireless communication network, the controller can change the type of the sound channel to be implemented and adjust the roles of the plurality of sub-sound outputting devices and the different sound output device in the changed sound channel.

In case a sub-sound outputting devices among the plurality of sub-sound outputting devices is disconnected, the controller can change the type of the sound channel to be implemented and adjust the roles of the plurality of sub-sound outputting devices in the changed sound channel.

The sound output device can further comprise a sensing unit sensing a user's position; and a driving unit capable of changing sound directions of the plurality of sub-sound outputting devices. At this time, the controller can change at least one sound direction of the plurality of sub-sound outputting devices based on the detected position of the user.

The sound output device can further comprise a display unit which is mounted in one of the plurality of sub-sound outputting devices and providing information about a sound channel established for the sound output device and information about the roles of the plurality of sub-sound outputting devices in the established sound channel.

The controller can provide information about a sound channel set with respect to the sound output device and information about the roles of the plurality of sub-sound outputting devices in the sound channel through a different electronic device coupled with the sound output device through a short range communication network.

To solve the technical problems above, a sound output device according to another embodiment of the present invention can comprise a plurality of sub-sound outputting devices which can be combined with or separated from each other and can be connected to each other electrically or through a short range communication network; a wireless communication unit being coupled with a different electronic device through a short range communication network; and a controller being mounted in one of the plurality of sub-sound outputting devices and controlling operations of the plurality of sub-sound outputting devices and the wireless communication unit. At this time, the controller can control the different electronic device to provide a graphic user interface for the sound output device and set the respective roles of the plurality of sub-sound outputting devices in the sound channel set for the sound output device.

The graphic user interface can provide information about a sound channel set for the sound output device and information about the positions of the plurality of sub-sound outputting devices.

The controller can configure a sound channel of the sound output device according to the operation on the graphic user interface.

The sound output device can further comprise a driving unit capable of changing sound directions of the plurality of sub-sound outputting devices. At this time, the controller can change sound directions of the plurality of sub-sound outputting devices according to the operation through the graphic user interface.

The controller can control whether to activate the plurality of sub-sound outputting devices on the basis of the operation on the graphic user interface.

The controller can provide recommended sound channel information corresponding to the sound output device through a graphic user interface provided through the different electronic device based on how the plurality of sub-sound means are combined and disposed.

The controller can provide a graphic user interface for selecting an electronic device supposed to provide a sound signal in association with the sound output device through the different electronic device.

Advantageous Effects

A user of the sound output device according to the present invention can produce a 3D sound space along a direction desired by the user.

A user of the sound output device according to the present invention can implement various types of sound channels by using a plurality of combinable/separable sub-sound outputting devices.

A user of the sound output device according to the present invention can perform a sound-related control function of the sound output device by using a different electronic device coupled with the sound output device.

DESCRIPTION OF DRAWINGS

FIG. 26 illustrates an example where a GUI for determining the roles of a plurality of sub-sound outputting devices of a sound output device according to the present invention is provided through a smartphone coupled with the sound output device according to a method for driving a sound output device shown in FIG. 24.

BEST MODE

Mode for Invention

The objects, characteristics, and advantages of the present invention will be more clearly understood through the following detailed descriptions with reference to appended drawings. In what follows, preferred embodiment of the present invention will be described in detail with reference to appended drawings. Throughout the document, the same reference numbers denote the same constituting elements.

Also, in case specific descriptions of functions or structures known to the public related to the present invention are determined to obscure the technical principles of the present invention, the detailed descriptions thereof will be omitted.

In what follows, a sound output device according to the present invention will be described in more detail with reference to appended drawings. A suffix such as "module" or "unit" may be assigned or used interchangeably to refer to constituting elements. Use of such a suffix herein is merely intended to facilitate description of the present invention, and the suffix itself is not intended to give any special meaning or function.

Figure 1:
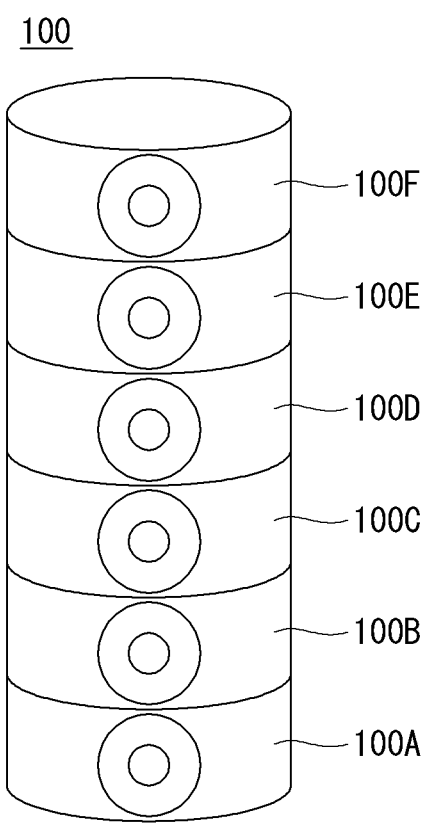
FIG. 1 illustrates a structure of a sound output device according to the present invention.

FIG. 1 illustrates a structure of a sound output device 100 according to the present invention.

With reference to FIG. 1, the sound output device 100 comprises a plurality of sub-sound outputting devices 100A to 100F. The plurality of sub-sound outputting devices 100A to 100F can be connected electrically to each other. The sound output device 100 can be a 5.1 channel speaker system.

The plurality of sub-sound outputting devices 100 can be separated from each other. At this time, the plurality of sub-sound outputting devices 100A to 100F may be connected to each other through short range wireless communication network. In other words, each of the plurality of sub-sound outputting devices 100A to 100F can be equipped with a wireless communication module to form a short range wireless communication network. The short range wireless communication can be implemented by using such technologies as Bluetooth, ZigBee, and WiFi. However, it should be noted that the present invention is not limited to the aforementioned technologies.

One 100A of the plurality of sub-sound outputting devices 100A to 100F may be a woofer 100A for producing a low frequency sound output. At least one of the plurality of sub-sound outputting devices 100A to 100F can include a controller (not shown in the figure) for controlling the overall operation of the sound output device 100. This document assumes that the woofer 100A is equipped with the controller.

Each of the plurality of sub-sound outputting devices 100A to 100F can include a separate power supply. And each of the plurality of sub-sound outputting devices 100A to 100F can have a corresponding operating frequency band. Also, the controller can change the respective frequency bands of the plurality of sub-sound outputting devices 100A to 100F.

Figure 2:
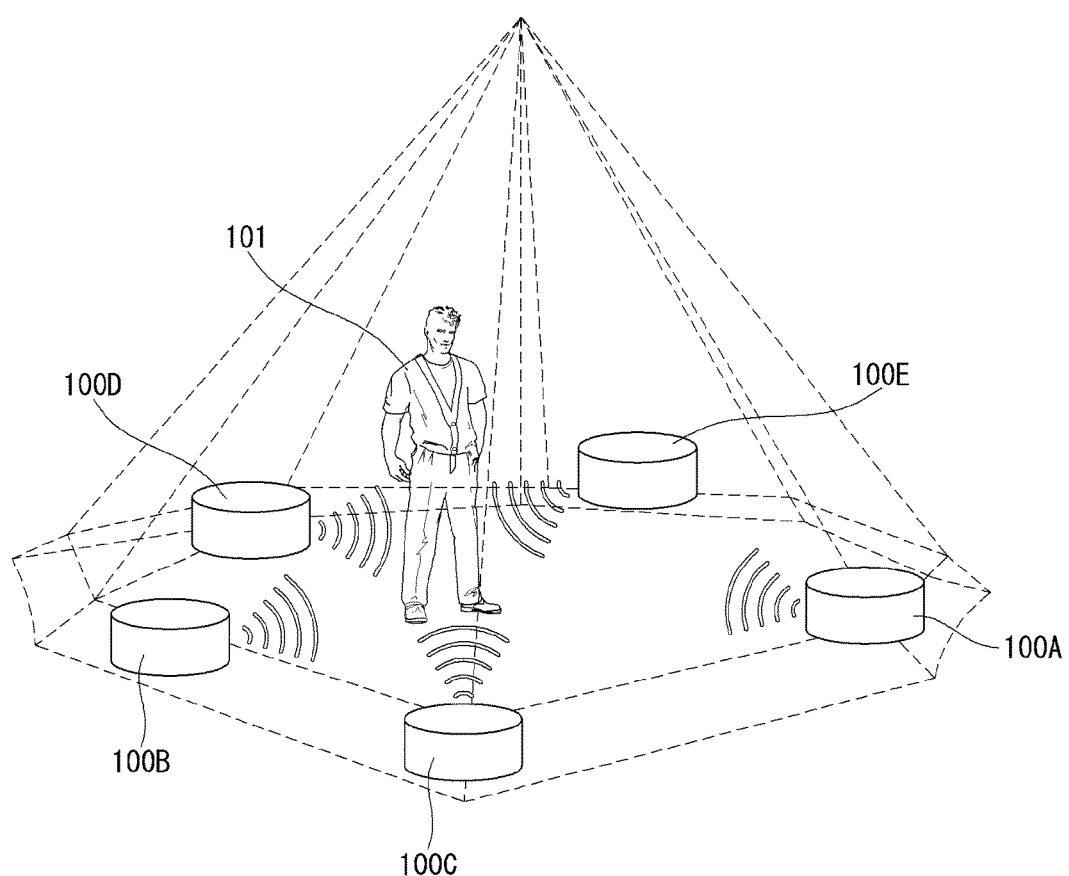
FIG. 2 illustrates an example of using a sound output device according to the present invention.

FIG. 2 illustrates an example of using a sound output device 100 according to the present invention.

FIG. 2 shows a situation where a plurality of sub-sound outputting devices 100A to 100E of the sound output device 100 are disposed around a user 101, being separated from each other. The controller of the sound output device 100 can allocate frequency bands corresponding to the plurality of sub-sound outputting devices 100A to 100E.

Taking into account the arrangement of the plurality of sub-sound outputting devices 100A to 100E, the controller can establish a particular sound channel by using the plurality of sub-sound outputting devices 100A to 100E. At this time, the controller can assign the respective roles in the established sound channel to the plurality of sub-sound outputting devices 100A to 100E.

Figure 3:
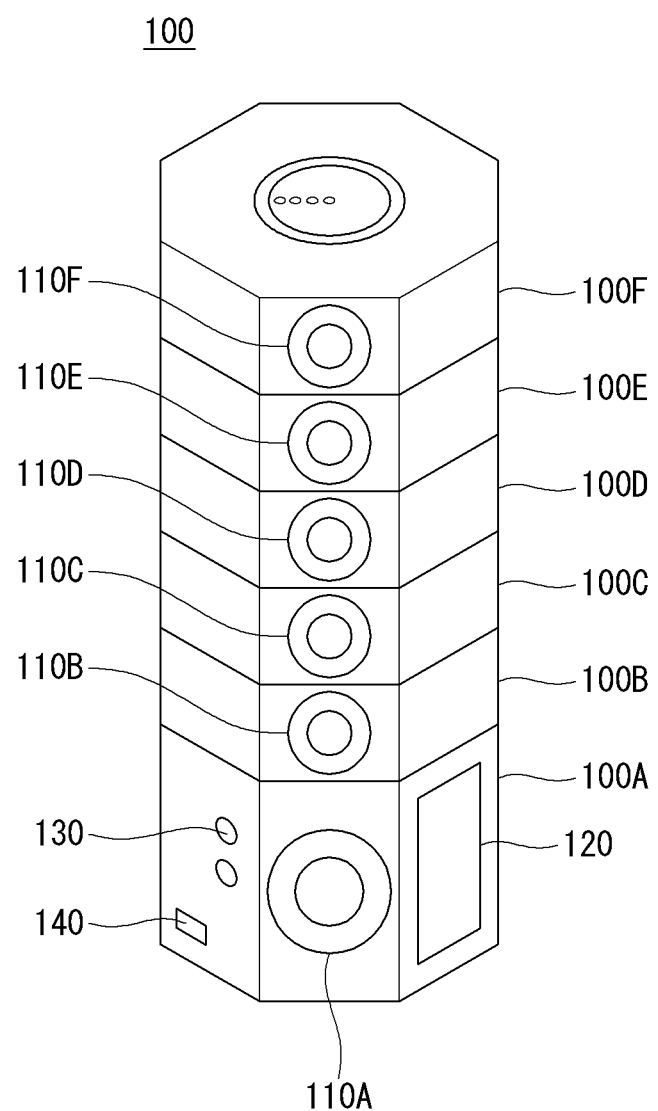
FIG. 3 is a perspective view of one example of a sound output device according to the present invention.

FIG. 3 is a perspective view of one example of a sound output device 100 according to the present invention.

The sound output device 100 has an octagonal column shape. The sound output device 100 includes a plurality of sub-sound outputting devices 100A to 100F. Among the plurality of sub-sound outputting devices 100A to 100F, a woofer 100A can be equipped with hardware for controlling the operation of the plurality of sub-sound outputting devices 100A to 100F.

The woofer 100A can include a speaker 110A producing a low frequency sound, display unit 120, power button 130, and power connector 140. However, it should be noted that the structure shown in FIG. 3 is only one example of embodiments of the present invention, and the technical scope of the present invention is not limited to the aforementioned structure. In other words, more constituting elements than are shown in FIG. 3 do not necessarily form essential elements comprising the woofer 100A of the sound output device 100 according to the present invention. The same interpretation is applied to the other drawings to be described afterwards.

The speaker 110A can produce a low frequency sound output. The display unit 120 can display various kinds of information about the operation of the sound output device 100 and control thereof. The power button 130 is used for applying or blocking power to the sound output device 100. The power connector 140 may be used for supplying external power or charging the sound output device 100.

Except for the woofer 100A, the plurality of sub-sound outputting devices 100B to 100F are equipped with the respective speakers 110b to 110E. As described above, the speakers 110b to 100E can have the respective operating frequency bands.

Figure 4:
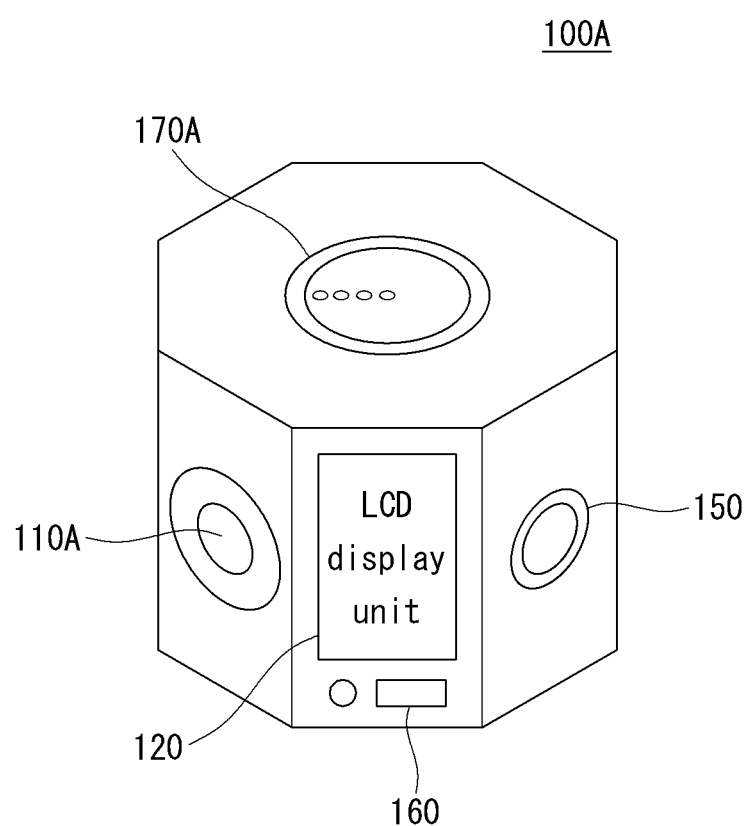
FIG. 4 illustrates another example of a woofer of sound output device according to the present invention.

FIG. 4 illustrates another example of a woofer 100A of sound output device 100 according to the present invention.

With reference to FIG. 4, the woofer 100A comprises a speaker 110A, display unit 120, air vent 150, external connecting connector 160, and connecting connector 170A. The speaker 110A and the display unit 120 have been already described with reference to FIG. 3. Therefore, detailed descriptions thereof will be omitted.

The air vent 150 is a hole through which air can enter or escape from the woofer according to the sound output operation of the woofer 100A. The external connecting connector 160 is a part where an AUX terminal and the like is connected. The connecting connector 170A connects a different sub-sound output device.

Figure 5:
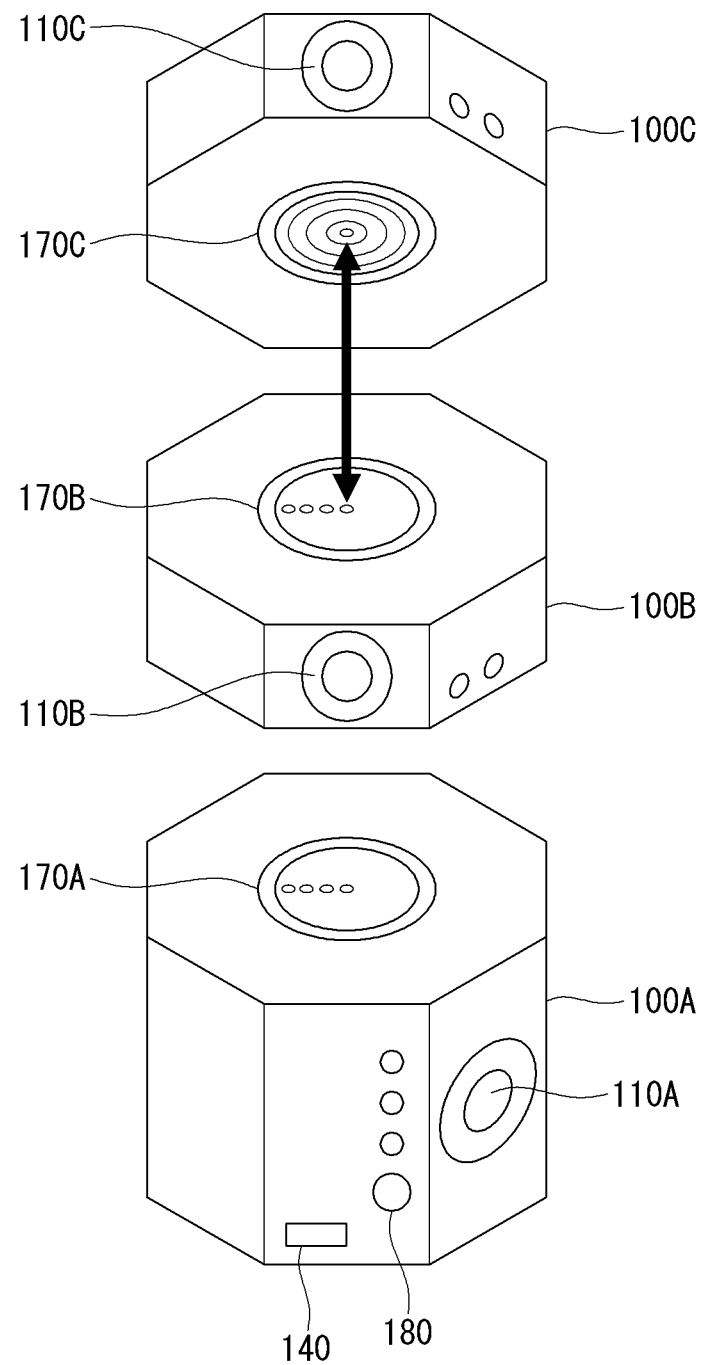
FIG. 5 illustrates a connecting structure of a plurality of sub-sound outputting devices included in a sound output device according to the present invention.

FIG. 5 illustrates a connecting structure of a plurality of sub-sound outputting devices 100A to 100F included in a sound output device according to the present invention.

A first sub-sound output device 100B and a second sub-sound output device 100C are connected to each other through connecting connectors 170B and 170C. At this time, the connection can include both electrical and physical connection. For example, the first sub-sound output device 100B and the second sub-sound output device 100C can be connected physically to each other by magnetic forces exerted by the connecting connectors 1706 and 170C. Also, the first sub-sound output device 1006 and the second sub-sound output device 100C may be connected electrically to each other by electrical connecting means within the connecting connectors 1706 and 170C.

Though not shown in the figure, the woofer 100A can be combined physically and electrically to the first sub-sound output device 100B through a connecting connector (not shown) prepared at the bottom of the first sub-sound output device 1006 and the connecting connector 170A prepared in the woofer 100A.

Meanwhile, the volume control button 180 shown in FIG. 5 controls the volume of the sound output device 100. The controller of the sound output device 100 may control the overall volume of the sound output device 100 according to the operation on the volume control button 180 or may selectively control the volume of a selected sub-sound output device.

Figure 6:
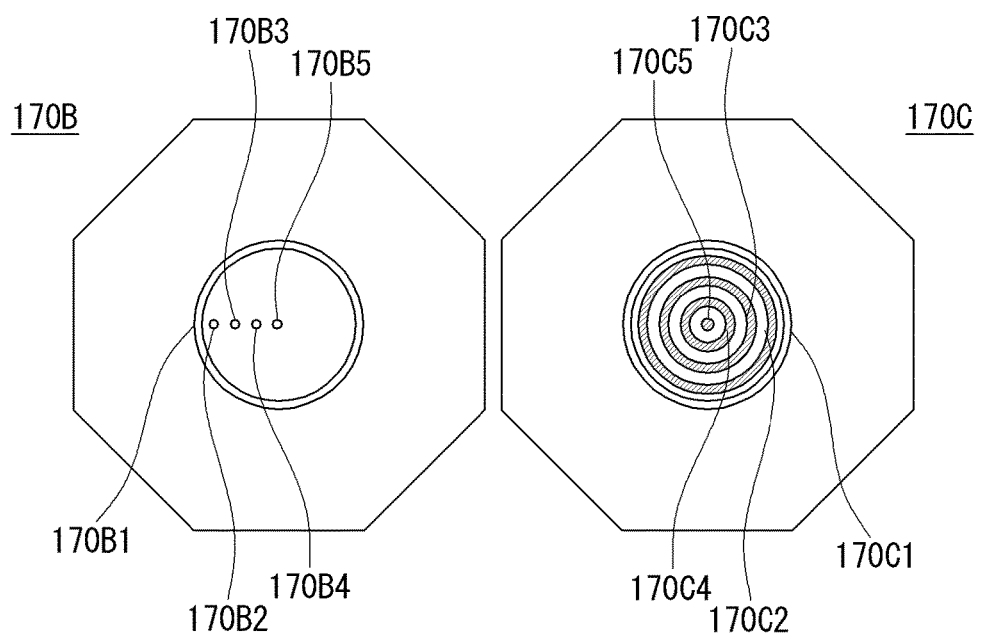
FIG. 6 illustrates how sub-sound outputting devices are combined in a sound output device according to the present invention.

FIG. 6 illustrates how sub-sound outputting devices are combined in a sound output device 100 according to the present invention.

The connecting connector 170B included in the first sub-sound output device 100B include a magnetic, male connecting part 170B1. The male connecting part 170B1 is combined with a magnetic, female connecting connector 170C1 included in the second sub-sound output device 100C. Accordingly, the first sub-sound output device 100B and the second sub-sound output device 100C are combined physically to each other.

A plurality of electrical connecting parts 170B2 to 170B5 included in the connecting connector 170B are connected to a plurality of electrical connecting parts 170C2 to 170O5 included in the different connecting connector 170C. Accordingly, the first sub-sound output device 100B and the second sub-sound output device 100C are connected electrically to each other.

Four electrically connecting routes are formed between the first sub-sound output device 100B and the second sub-sound output device 100C, of which two routes can be allocated for battery charging and the other two can be used for communication. However, the technical scope of the present invention is not limited to the description above.

Meanwhile, the connection topology between the connectors 170B and 170C is retained even under rotation of the first sub-sound output device 100B and the second sub-sound output device 100C. Therefore, a user can change sound directions of the first 100B and the second sub-sound output device 100C while retaining the connection topology between the first 100B and the second sub-sound output device 100C.

Figure 7:
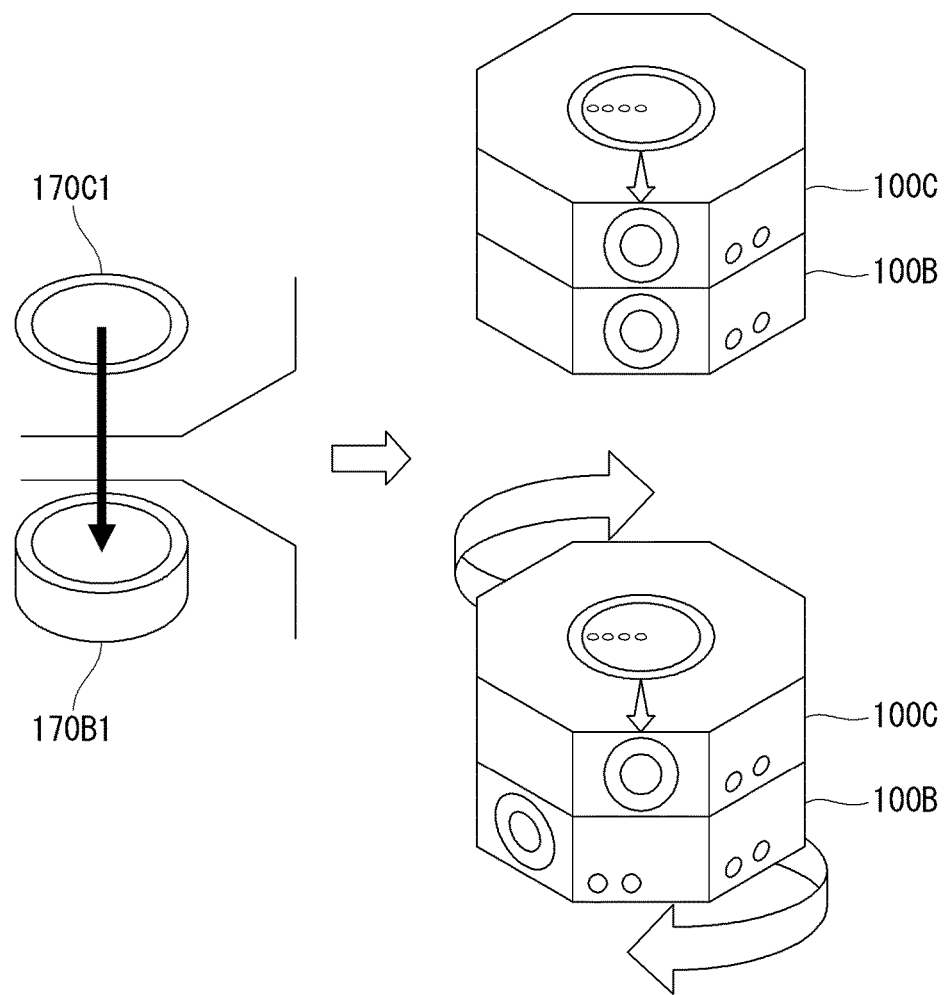
FIG. 7 illustrates how sound directions of sub-sound outputting devices are changed in a sound output device according to the present invention.

FIG. 7 illustrates how sound directions of sub-sound outputting devices are changed in a sound output device 100 according to the present invention.

As described with reference to FIG. 6, the connection topology between the connecting connectors 170B and 170C of the first 100B and the second sub-sound output device 100C can be retained even under rotation thereof. Therefore, as shown in FIG. 7, even if orientation of the first sound-outputting device 100B is changed, electrical and physical connection between the first 100B and the second sub-sound output device 100C can be maintained.

As shown in FIG. 7, in case the sound output device 100 is formed in an octagonal column shape, the rotation angle of a plurality of sub-sound outputting devices 100A to 100F can be changed by the unit of 45 degrees which divide 360 degrees into 8 sections. However, the technical scope of the present invention is not limited to the particular configuration described above.

Meanwhile, the sound output device 100 can further comprise a driving unit (not shown) for changing sound directions of the plurality of sub-sound outputting devices 100A to 100F. Change of sound directions of the plurality of sub-sound outputting devices 100A to 100F can be performed under the control of the controller.

Figure 8:
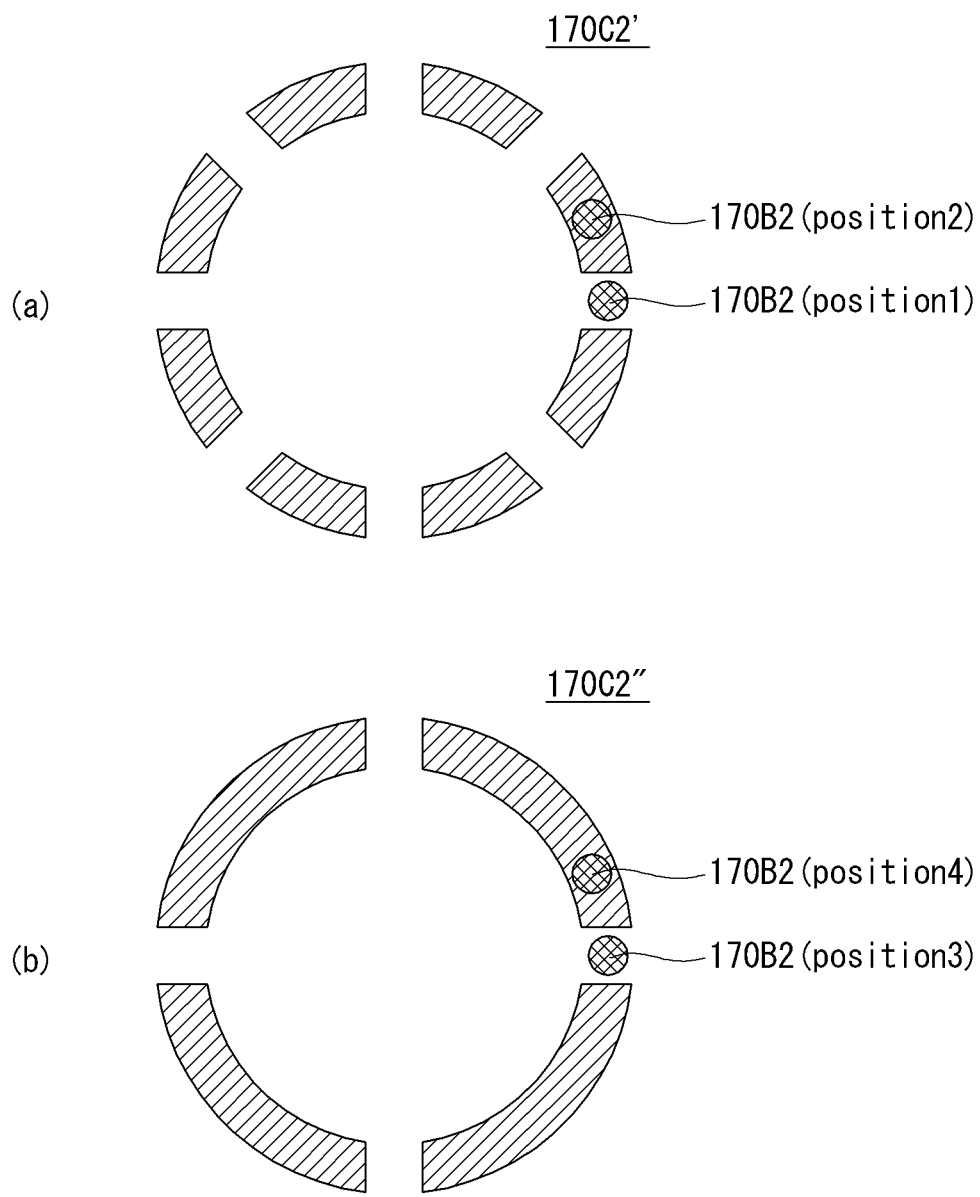
FIG. 8 illustrates how a plurality of sub-sound outputting devices are combined with each other in a sound output device according to the present invention.

FIG. 8 illustrates how a plurality of sub-sound outputting devices 100A to 100F are combined with each other in a sound output device 100 according to the present invention.

FIG. 8(*a*) illustrates one example of electrical connecting means 170C2' of a connecting connector included in a second sub-sound output device 100C. As the figure shows, the electrical connecting means 170C2' is partitioned into 8 segments. This configuration allows the second sub-sound output device 100C and a different sub-sound output device to rotate in units of 8 segments when they are connected to each other.

For example, in case the second sub-sound output device 100C is connected to the first sub-sound output device 100B, electrical connection between the two devices can be blocked if the electrical connecting means of the first sub-sound output device 100B is placed at position 1. However, the two devices can be connected to each other if the electrical connecting means of the first sub-sound output device 100B is placed at position 2.

FIG. 8(*b*) shows an example where the electrical connecting means 170C2" included in the second sub-sound output device 100C is divided into four segments. This configuration allows the second sub-sound output device 100C and a different sub-sound output device to rotate in units of four segments when they are connected to each other. Since the connection topology between the two devices is similar to the example of FIG. 8(*a*), detailed descriptions thereof will be omitted.

Figure 9:
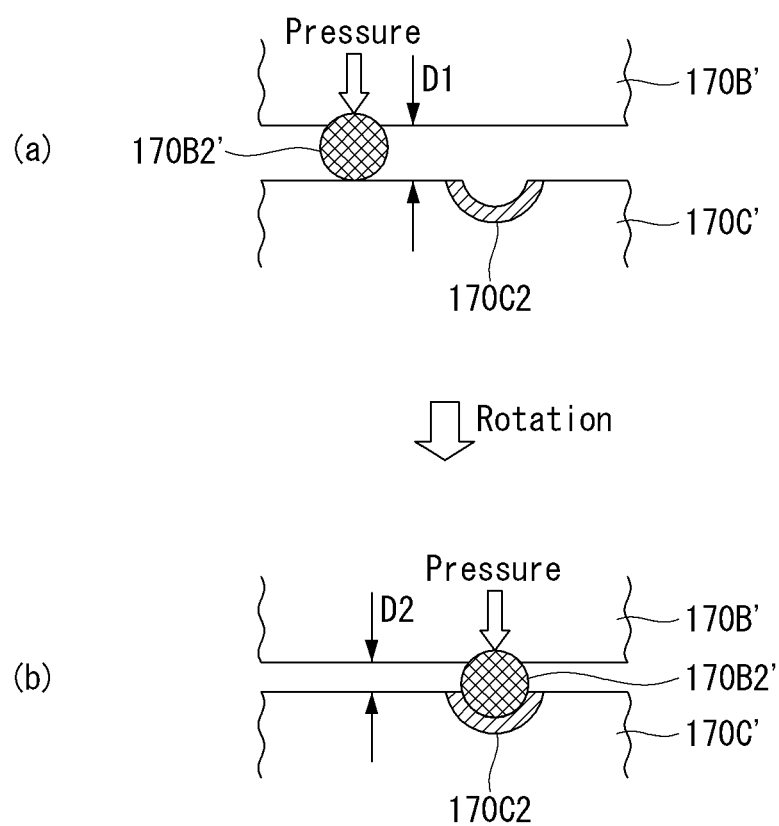
FIG. 9 illustrates another example of how a plurality of sub-sound outputting devices are combined with each other in a sound output device according to the present invention.

FIG. 9 illustrates another example of how a plurality of sub-sound outputting devices 100A to 100F are combined with each other in a sound output device 100 according to the present invention.

The connecting connector 170B' included in the first sub-sound output device 100B includes an electrical connecting means 170B22' in a spherical shape, receiving pressure along the direction of the connecting connector 170C1' of the second sub-sound output device 100C.

If the electrical connecting means 170B2' in a spherical shape is positioned at the position corresponding to the electrical connecting means 170C2 of the connecting connector 170C' due to rotation from the state illustrated in FIG. 9(*a*), electrical connection is established between the sphere-shaped electrical connecting means 170B2' and the electrical connecting means 170C2 by the pressure applied on them. At this time, distance between the first sub-sound output device 100B and the second sub-sound output device 100C is shortened from D1 to D2.

Figure 10:
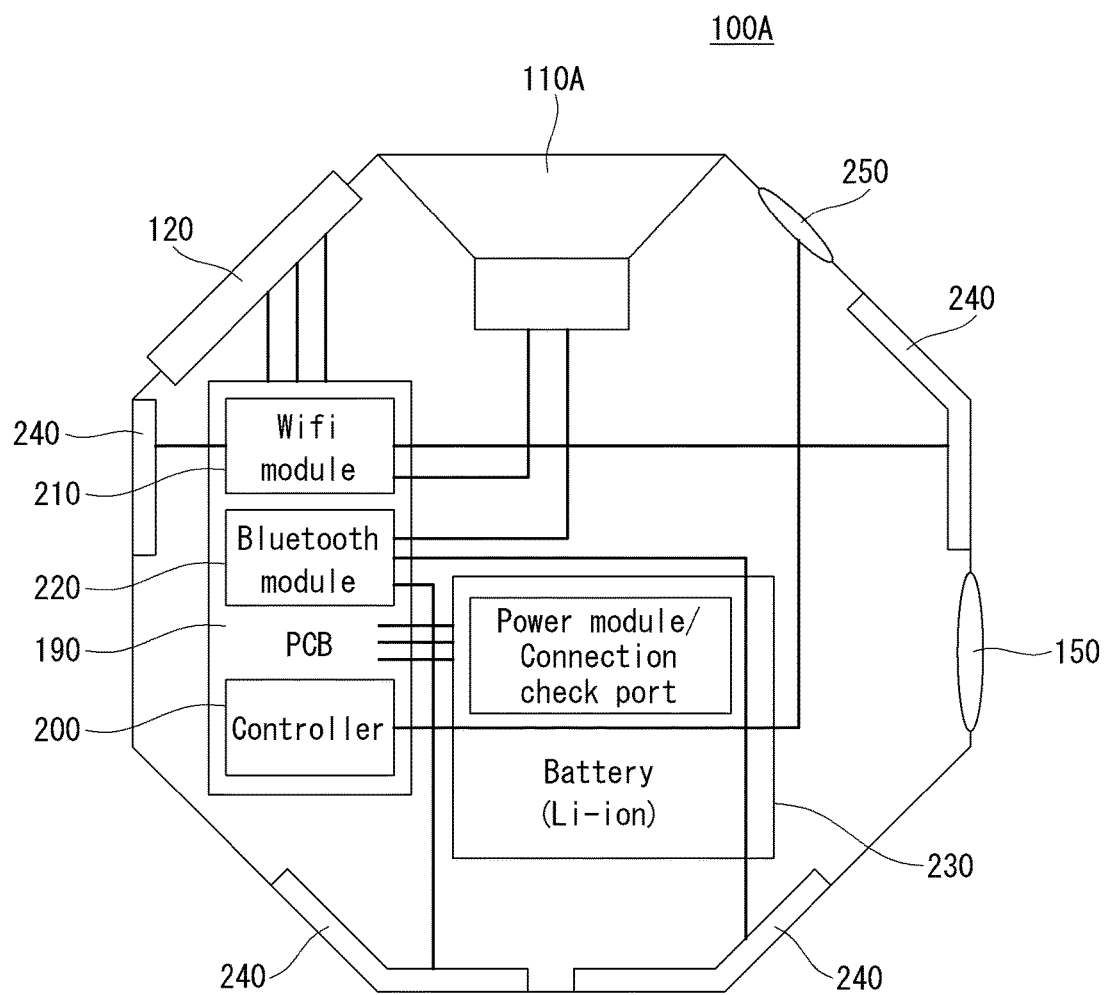
FIG. 10 illustrates a yet another example of a woofer of a sound output device according to the present invention.

FIG. 10 illustrates a yet another example of a woofer 100A of a sound output device 100 according to the present invention.

With reference to FIG. 10, the woofer 100A can include a speaker 110A, display unit 120, air vent 150, Printed Circuit Board (PCB) 190, controller 200 mounted on the PCB 190, Wi-Fi module 210, Bluetooth module 220, battery module 230, and a plurality of Wi-Fi antennas 240, and button 250.

Since the speaker 110A, display unit 120, and air vent 150 have already been described above, detailed descriptions thereof will be omitted. At least one of the Bluetooth module 220 and WI-FI module 210 is responsible for wireless communication with other sub-sound outputting devices and wireless communication with other external electronic devices.

The battery module 230 supplies power to the woofer 100A. Meanwhile, as shown in FIG. 10, the battery module 230 may include a power module and a connection check port.

The button 250 can be assigned to perform a specific function of the woofer 100A or to perform a specific function for the whole sound output device 100. Meanwhile, the woofer 100A may further comprise a plurality of other buttons assigned to the respective functions.

Figure 11:
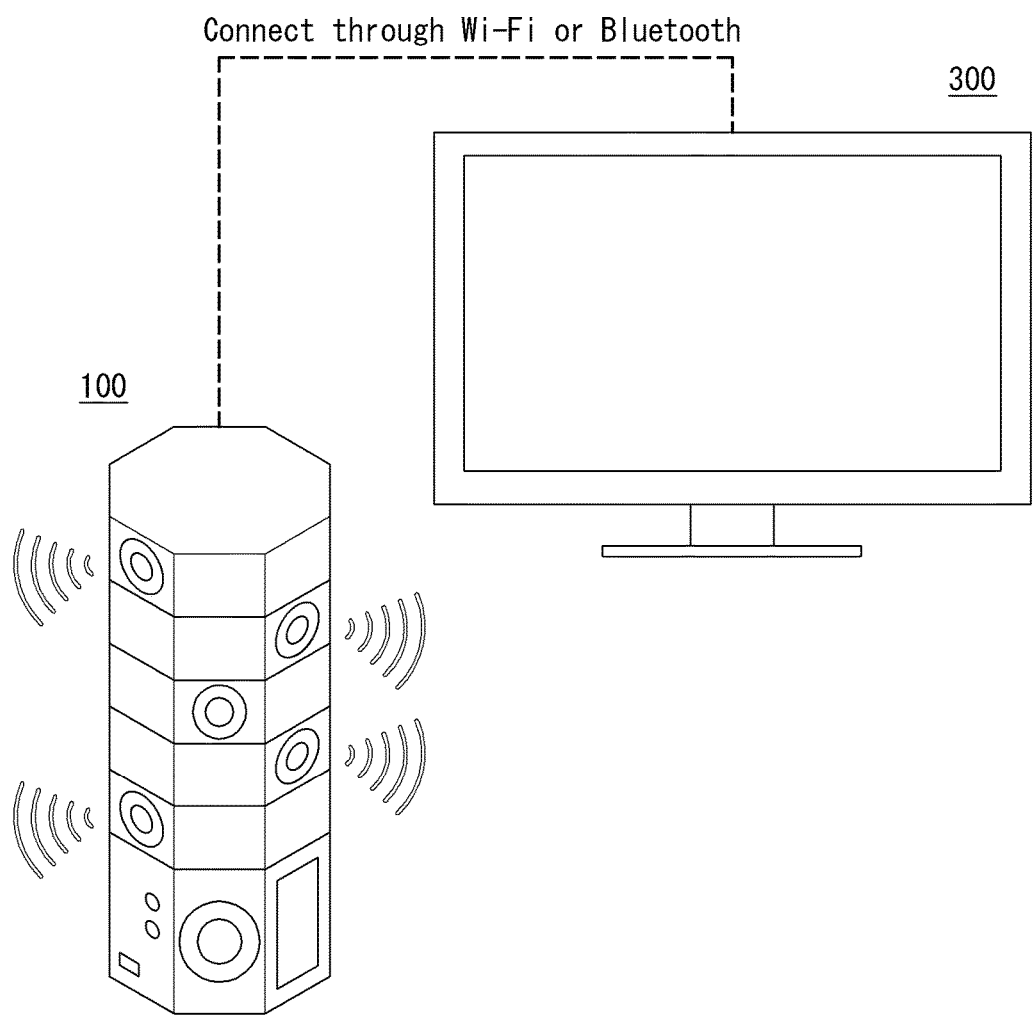
FIGS. 11 and 12 illustrate examples where a sound output device according to the present invention outputs a sound signal in association with a different electronic device.
Figure 12:
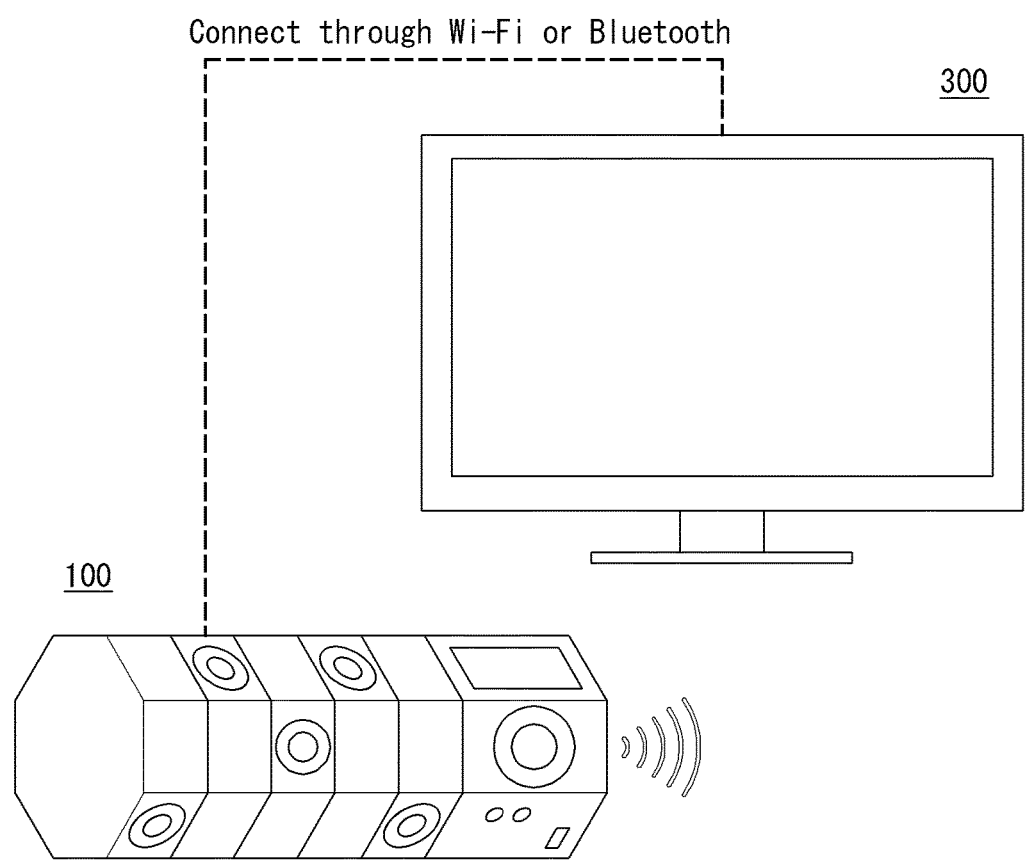

FIGS. 11 and 12 illustrate examples where a sound output device 100 according to the present invention outputs a sound signal in association with a different electronic device 300.

With reference to FIGS. 11 and 12, it can be seen that the sound output device 100 is capable of outputting a sound signal received from an external electronic device 300. In particular, with reference to FIG. 11, the sound output device 100 is capable of outputting a sound signal along different directions through a plurality of sub-sound outputting devices set to different sound directions respectively. At this time, the sub-sound outputting devices having the respective sound directions can have individual roles in a sound channel established in the sound output device 100.

With reference to FIG. 12, the sound output device 100 is capable of outputting a sound signal produced by the external electronic device 300 along the same, single sound direction. At this time, too, specific roles in a sound channel established in the sound output device 100 can be assigned to the respective sub-sound outputting devices comprising the sound output device 100.

Figure 13:
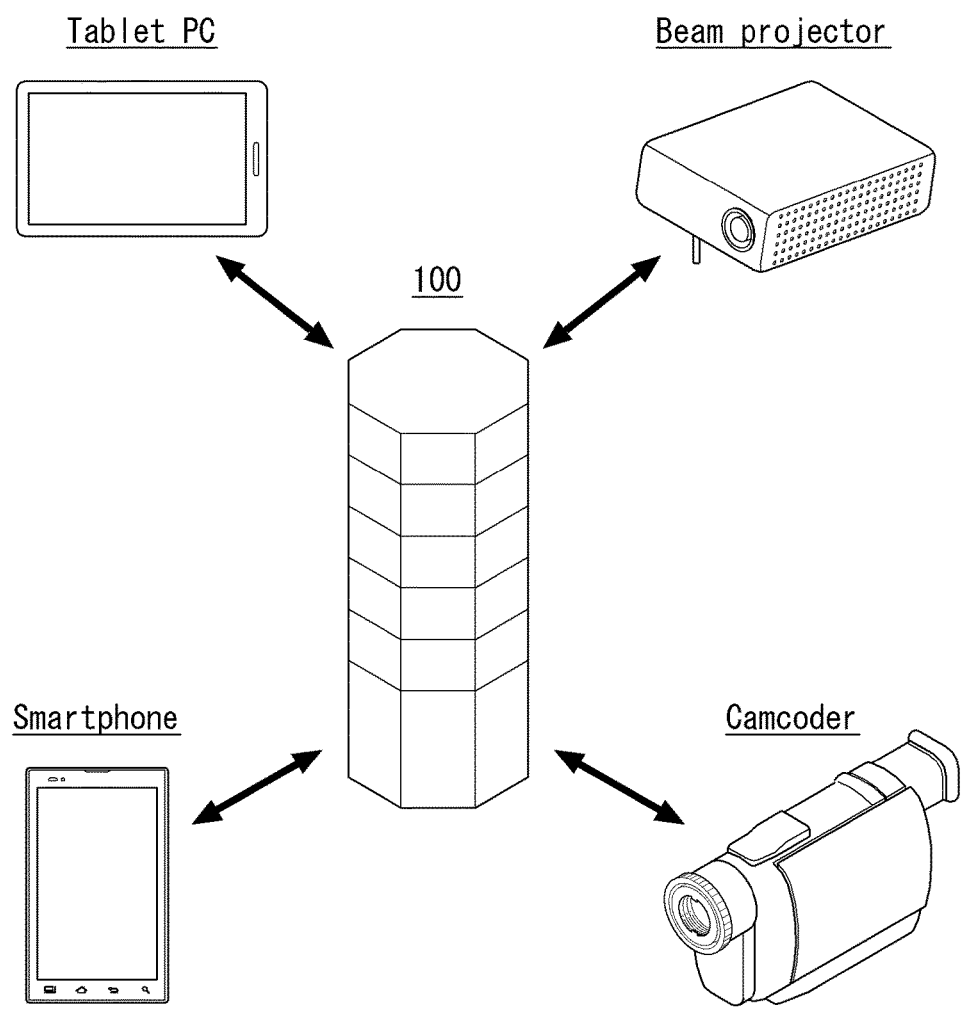
FIG. 13 illustrates examples of different electronic devices with which a sound output device according to the present invention is associated.

FIG. 13 illustrates examples of different electronic devices with which a sound output device according to the present invention is associated.

With reference to FIG. 13, the sound output device 100 can be coupled with a smartphone, tablet PC, bean projector, and camcorder. In other words, the sound output device 100 can receive a sound signal from the electronic devices and outputs the received sound signal. Meanwhile, the sound output device 100 may be coupled to the different electronic devices through a wireless communication network or through wire.

Figure 14:
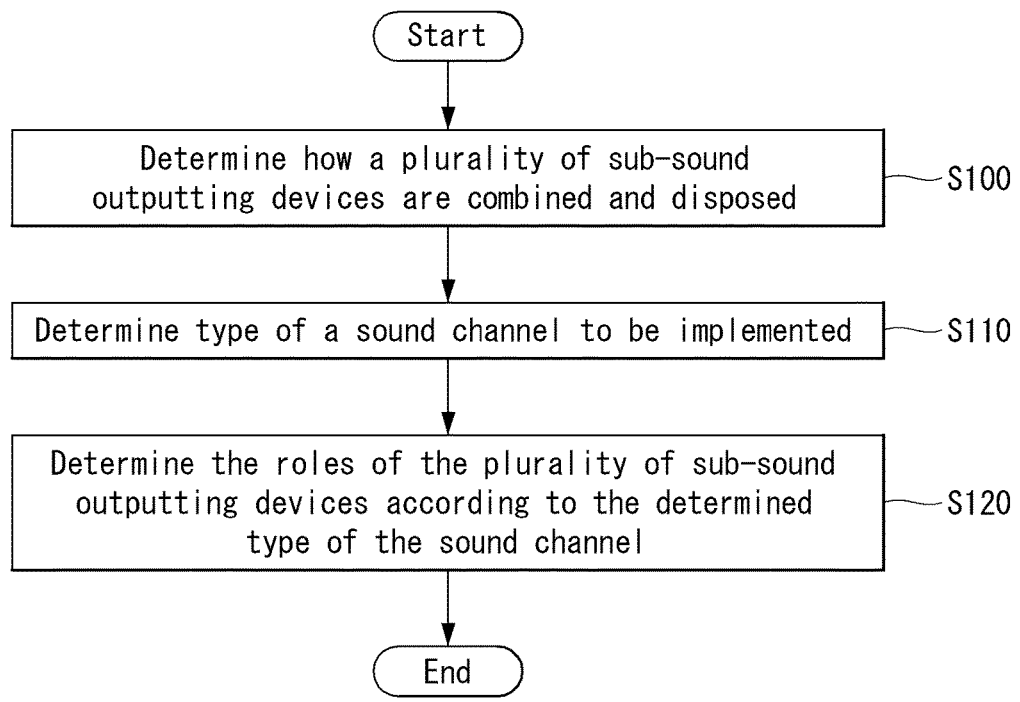
FIG. 14 is a flow diagram illustrating one example of a method for driving a sound output device according to the present invention.

FIG. 14 is a flow diagram illustrating one example of a method for driving a sound output device according to the present invention. In what follows, the method for driving a sound output device will be described with reference to related drawings.

As described above, the sound output device 100 can be combinable/separable and includes a plurality of sub-sound outputting devices that can be connected to each other electrically or through a short range communication network. In this configuration, the controller 200 of the sound output device 100 determines how the plurality of sub-sound outputting devices are combined and disposed S100. The controller can receive the information required for the determination through an electrical connecting route or through a short range communication network.

Then the controller 200 determines the type of a sound channel to be established through the sound output device 100 based on the determined form of combination and disposition of the plurality of sub-sound outputting devices S110. Next, the controller 200 determines the roles of the plurality of sub-sound outputting devices in the sound channel established S120.

Figure 15:
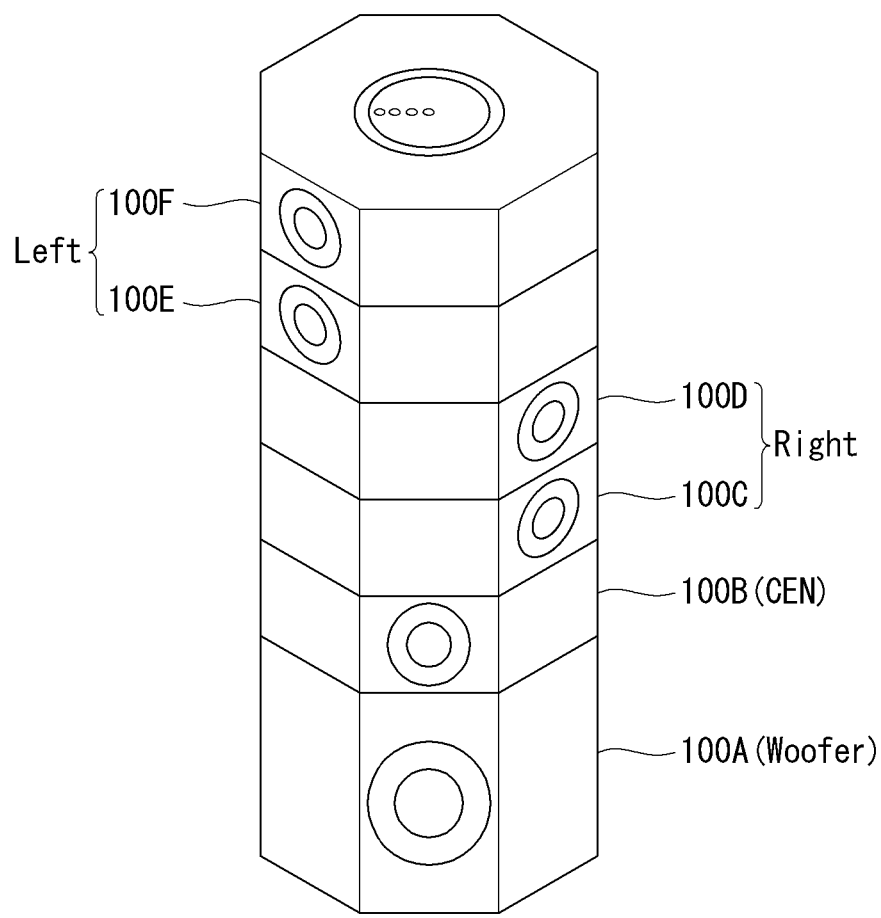
FIGS. 15 to 17 illustrate examples of how roles of a plurality of sub-sound outputting devices are determined with respect to a sound channel according to a method for driving a sound output device shown in FIG. 4.
Figure 16:
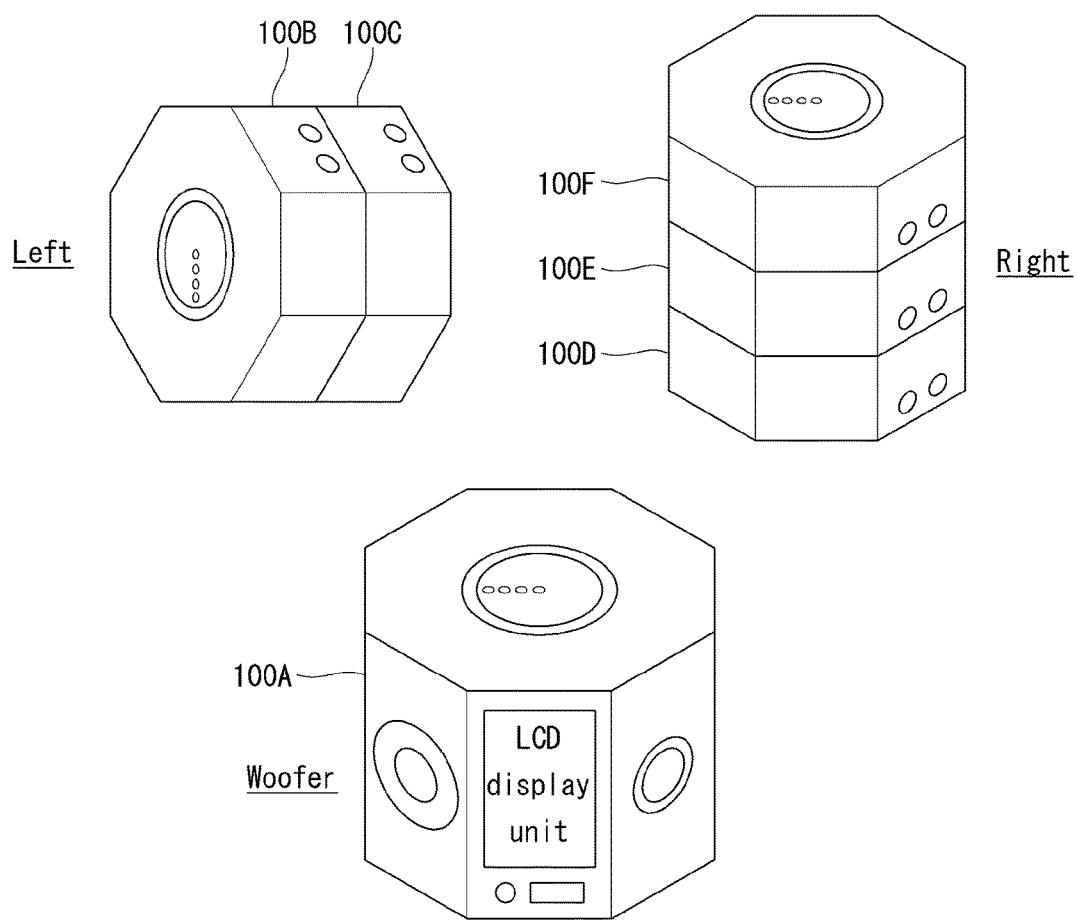
Figure 17:
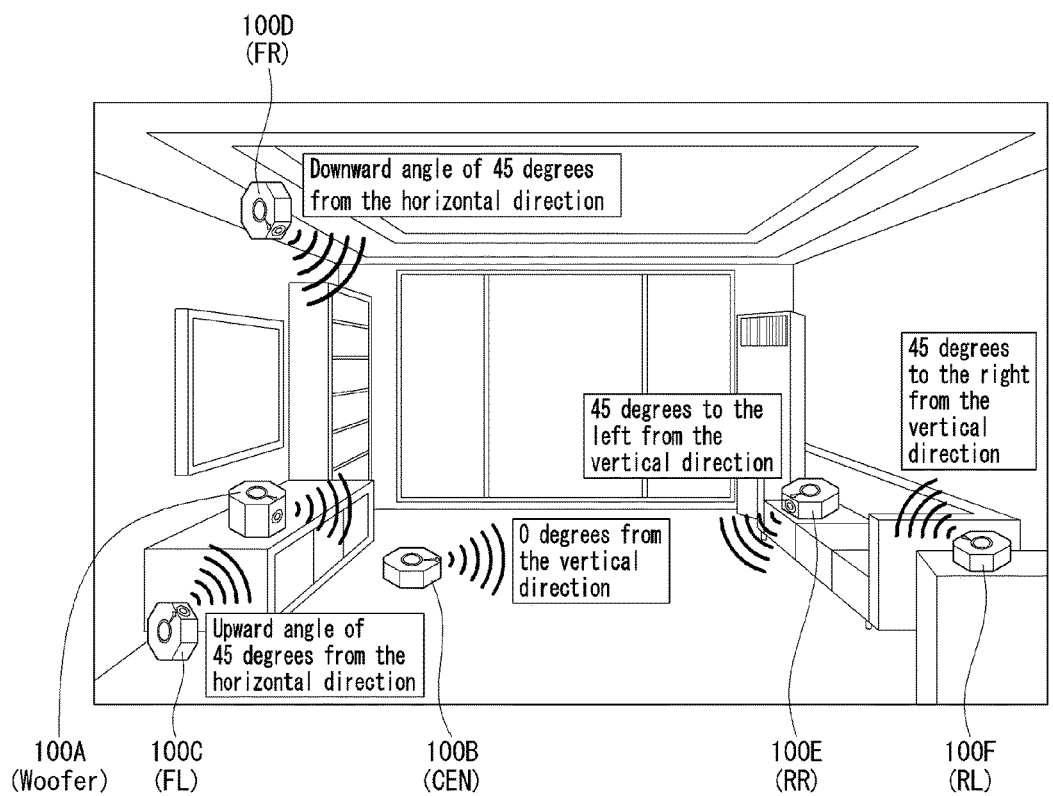

FIGS. 15 to 17 illustrate examples of how roles of a plurality of sub-sound outputting devices are determined with respect to a sound channel according to a method for driving a sound output device shown in FIG. 4.

With reference to FIG. 15, while a plurality of sub-sound outputting devices included in the sound output device 100 are combined to each other, the plurality of sub-sound outputting devices are pointing to specific directions. More specifically, the woofer 100A and one sub-sound output device 1006 are directed to the front; two sub-sound outputting devices 100C and 100D are directed to the right; and two sub-sound outputting devices 100E and 100F are directed to the left.

At this time, the controller 200 of the sound output device 100 can set the one sub-sound output device 100B as a central speaker, the two sub-sound outputting devices 100C and 100D as right speakers, and the two sub-sound outputting devices 100E and 100F as left speakers, thereby setting up the sound channel realized by the sound output device 100 as a 3.1 channel.

Though FIG. 15 illustrates sound directions of the plurality of sub-sound outputting devices while they are combined together, the sound output device 100 according to the present invention may determine the roles of the plurality of sub-sound outputting devices in a sound channel based on the sound directions of the plurality of sub-sound outputting devices while they are separated from each other.

As described above, a sound output device 100 according to the present invention can determine the roles of the plurality of sub-sound outputting devices in the determined sound channel on the basis of the respective sound directions of the plurality of sub-sound outputting devices.

With reference to FIG. 16, two combined sub-sound outputting devices 100B and 100C are disposed to the left of the woofer 100A, and three combined sub-sound outputting devices 100D, 100E, and 100F are disposed to the right of the woofer 100A. At this time, the controller 200 of the sound output device 100 sets the two sub-sound outputting devices 1006 and 100C as left speakers and the three sub-sound outputting devices 100D, 100E, and 100F as right speakers, thereby setting up the sound channel realized by the sound output device 100 as a 2.1 channel.

With reference to FIG. 17, a woofer 100A and one sub-sound output device 100B are disposed in the front left of a living room; one sub-sound output device 100C is disposed in the front left of the living room; and one sub-sound output device 100D is disposed in the front right. And one sub-sound output device 100E is disposed in the rear left, and one sub-sound output device 100F is disposed in the rear left.

At this time, the controller 200 of the sound output device 100 can set up the sound channel formed in the sound output device 100 as a 5.1 channel according to the disposition of the plurality of sub-sound outputting devices. In other words, the sound output device 100 automatically forms a 5.1 sound channel customized for a user sitting in the middle of the living room based on the disposition of the plurality of sub-sound outputting devices comprising the 5.1 sound channel.

Meanwhile, FIG. 17 shows the respective sound directions and orientations of the plurality of sub-sound outputting devices. The horizontal direction from among sound directions indicates that the corresponding sub-sound output device in an octagonal column shape is in the upright position. And the vertical direction indicates that one of the side surfaces of the corresponding sub-sound output device in the octagonal column shape is disposed in parallel to the ground plane.

The specific angle of the sound direction represents the orientation angle of the speaker of the corresponding sub-sound output device, namely sound direction of the sub-sound output device. For example, the sound direction of the speaker of the sub-sound output device 100C disposed on the front left floor is at an upward angle of 45 degrees from the horizontal direction. And the sound direction of the speaker of the sub-sound output device 100D disposed on the front right ceiling is at a downward angle of 45 degrees from the horizontal direction.

Figure 18:
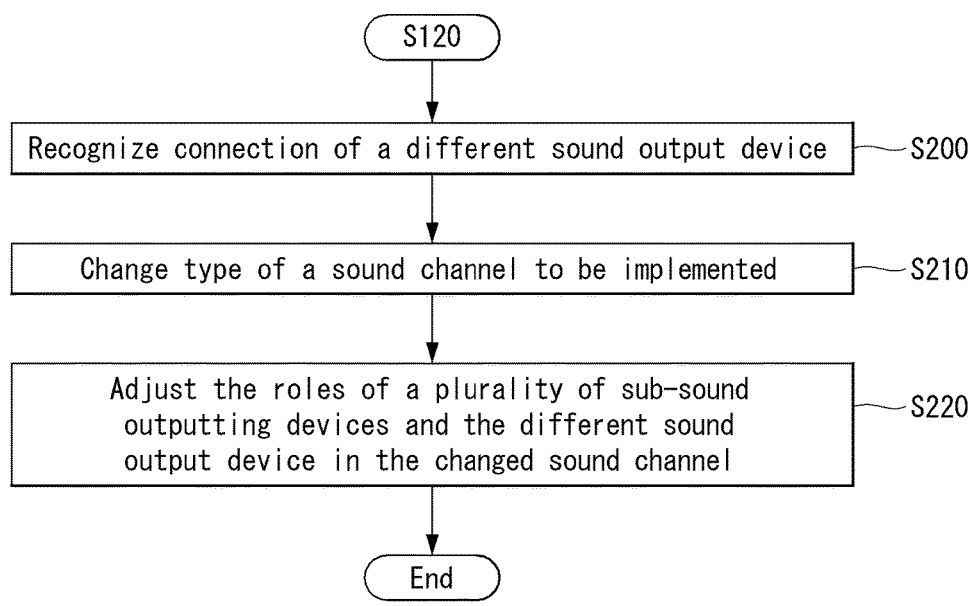
FIG. 18 illustrates a flow diagram illustrating another example of a method for driving a sound output device according to the present invention. In what follows, the method for driving a sound output device will be described with reference to related drawings.

FIG. 18 illustrates a flow diagram illustrating another example of a method for driving a sound output device according to the present invention. In what follows, the method for driving a sound output device will be described with reference to related drawings.

The controller 200 of the sound output device 100 recognizes a different sound output device being connected to the sound output device 100, S200. At this time, the different sound output device can be coupled to the sound output device 100 through an electrical connection or a short range wireless communication network. The different sound output device may be a passive-type speaker system capable of a sound output function only or an independent, active electronic device equipped with a separate sound output device.

Recognizing connection of a different sound output device, the controller 200 changes the type of a sound channel to be formed through the sound output device 100, S210. And the controller 200 adjusts the roles of the plurality of sub-sound outputting devices and the different sound output device in the changed sound channel S220.

Figure 19:
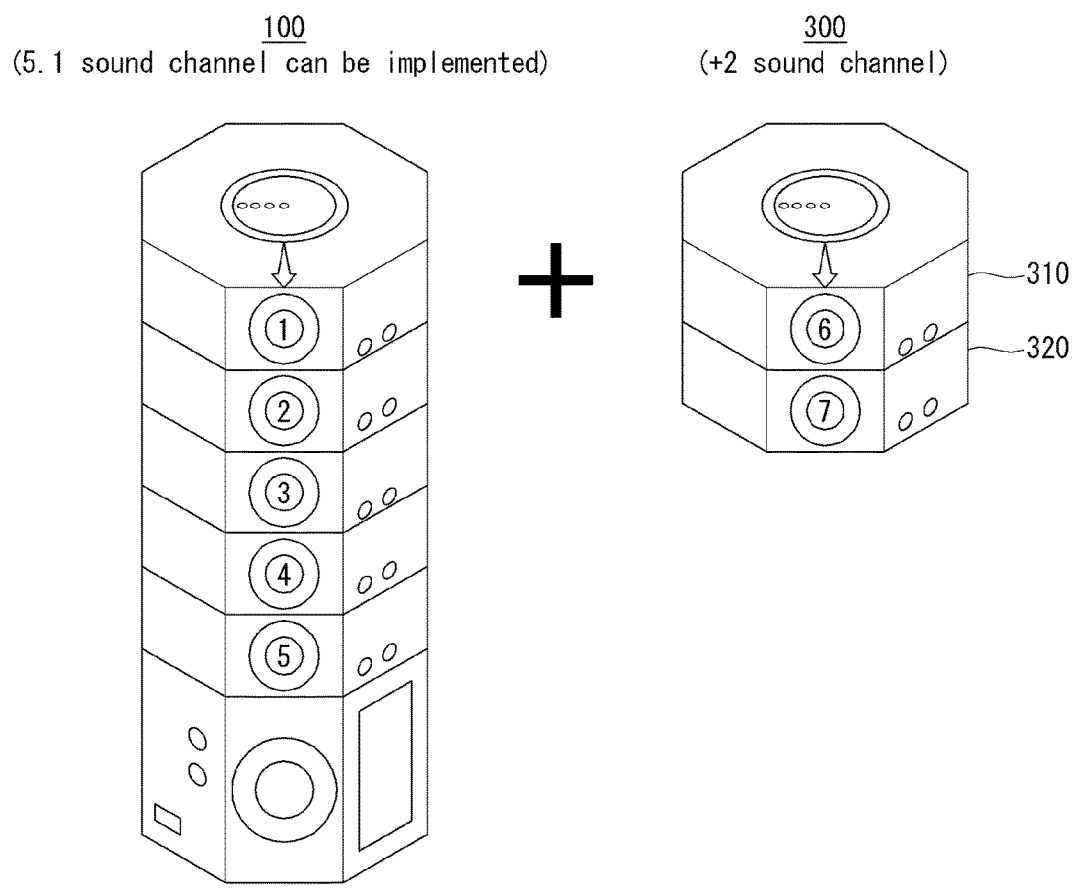
FIGS. 19 and 20 illustrate examples of how roles of a plurality of sub-sound outputting devices are determined with respect to a sound channel according to a method for driving a sound output device shown in FIG. 18.
Figure 20:
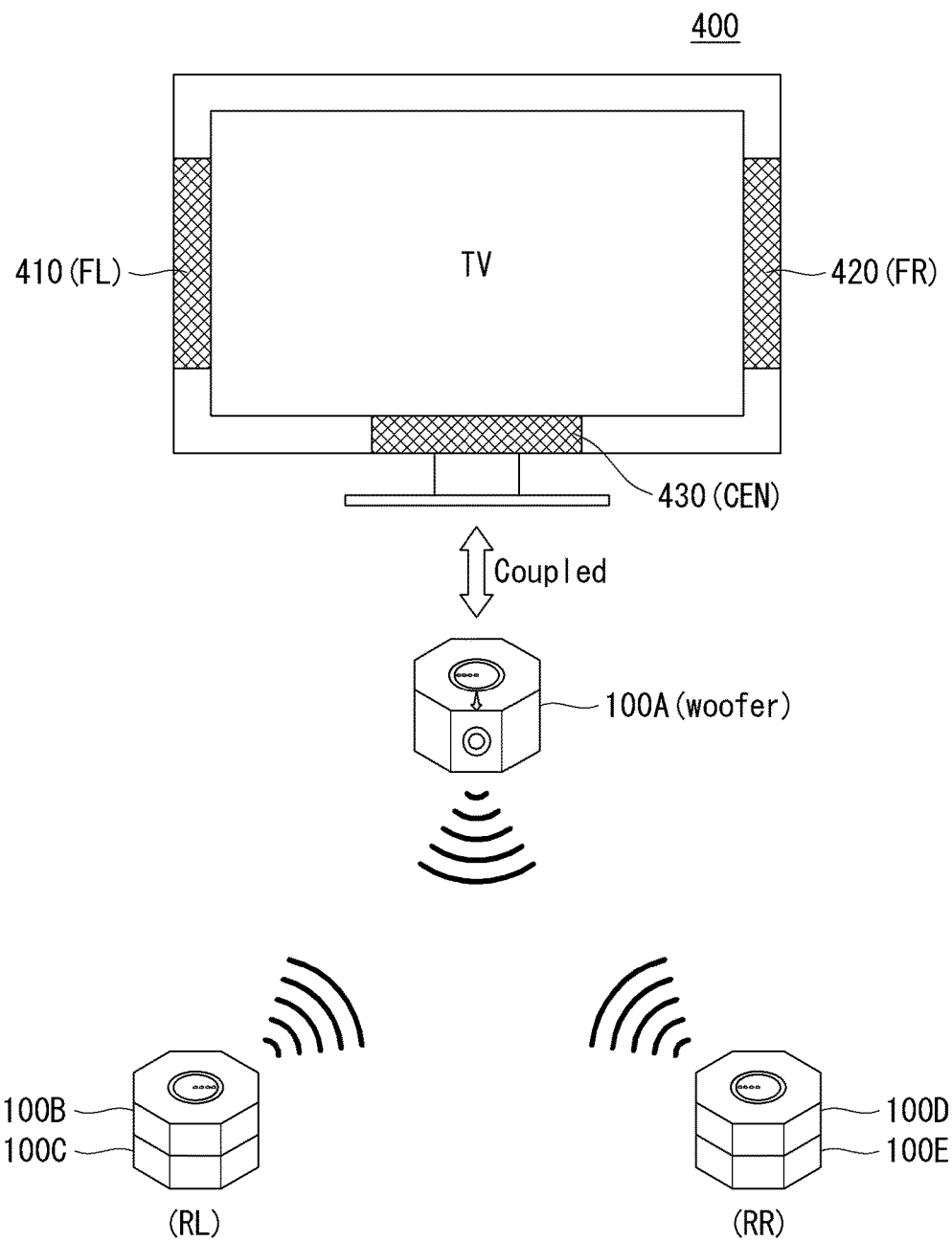

FIGS. 19 and 20 illustrate examples of how roles of a plurality of sub-sound outputting devices are determined with respect to a sound channel according to a method for driving a sound output device shown in FIG. 18.

With reference to FIG. 19, a sound output device 300 capable of being coupled to the sound output device 100 is connected to the sound output device 100. Then the controller 200 of the sound output device 100 can recognize that a 7.1 sound channel can be formed by the sound output device 100 and the different sound output device 300.

And the controller 200 can determine a sound channel to form through the sound output device 100 and the different sound output device 300 based on how a plurality of sub-sound outputting devices included in the sound output device 100 and a plurality of sub-sound output device 310 and 320 included in the different sound output device 300; and determine the roles of the sub-sound outputting devices included in the sound output devices in the sound channel determined.

FIG. 20 illustrates an example where the sound output device 100 is coupled to TV 400. More specifically, FIG. 20 illustrates an example where a 5.1 sound channel is implemented according to the roles divided by the sub-sound outputting devices included in the sound output device 100 and the TV 400.

In the 5.1 sound channel, the woofer 100A of the sound output device 100 performs the role of a woofer; two combined sub-sound outputting devices 100B and 100C perform the role of a rear left speaker; and two combined sub-sound outputting devices 100D and 100E perform the role of a rear right speaker. And, in the 5.1 sound channel, the sub-sound output device 430 disposed at the center of the TV 400 performs the role of a center speaker; the left sub-sound output device 410 performs the role of a left speaker; and the right sub-sound output device 420 performs the role of a front right speaker.

Figure 21:
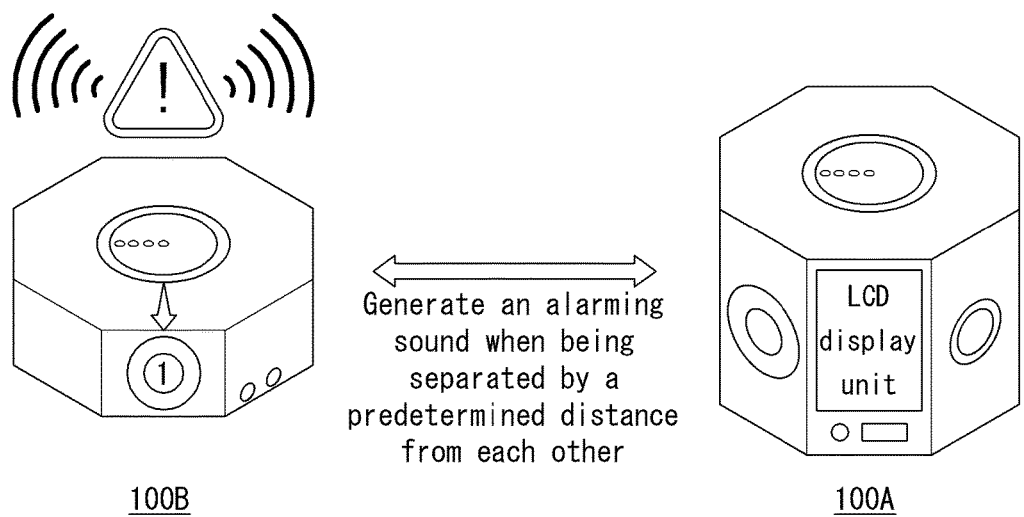
FIG. 21 illustrates a function for generating an alarm sound in a sound output device according to the present invention.

FIG. 21 illustrates a function for generating an alarm sound in a sound output device 100 according to the present invention.

The controller 200 of the sound output device 100 may be sensing distances to a plurality of sub-sound outputting devices. If the distance to the sub-sound output device exceeds a predetermined distance, the controller 200 generates an alarm sound to perform an alarming function for the user. At this time, the predetermined distance can be determined on the basis of an effective communication range of a short range wireless communication network through which the plurality of sub-sound outputting devices are coupled to each other.

With reference to FIG. 21, in case one sub-sound output device 100B is located beyond a predetermined distance while the controller 200 is mounted in the woofer 100A, the controller 200 can make the sub-sound output device 100B generate an alarming sound.

Meanwhile, in case one of the plurality of sub-sound outputting devices is decoupled from the others, the controller 200 may change the type of the sound channel to be implemented and re-adjust the roles of the sub-sound outputting devices in the changed sound channel. At this time, with reference to FIG. 21, decoupling may be caused by a sub-sound output device getting apart beyond a predetermined distance or by a sub-sound output device running out of power.

Figure 22:
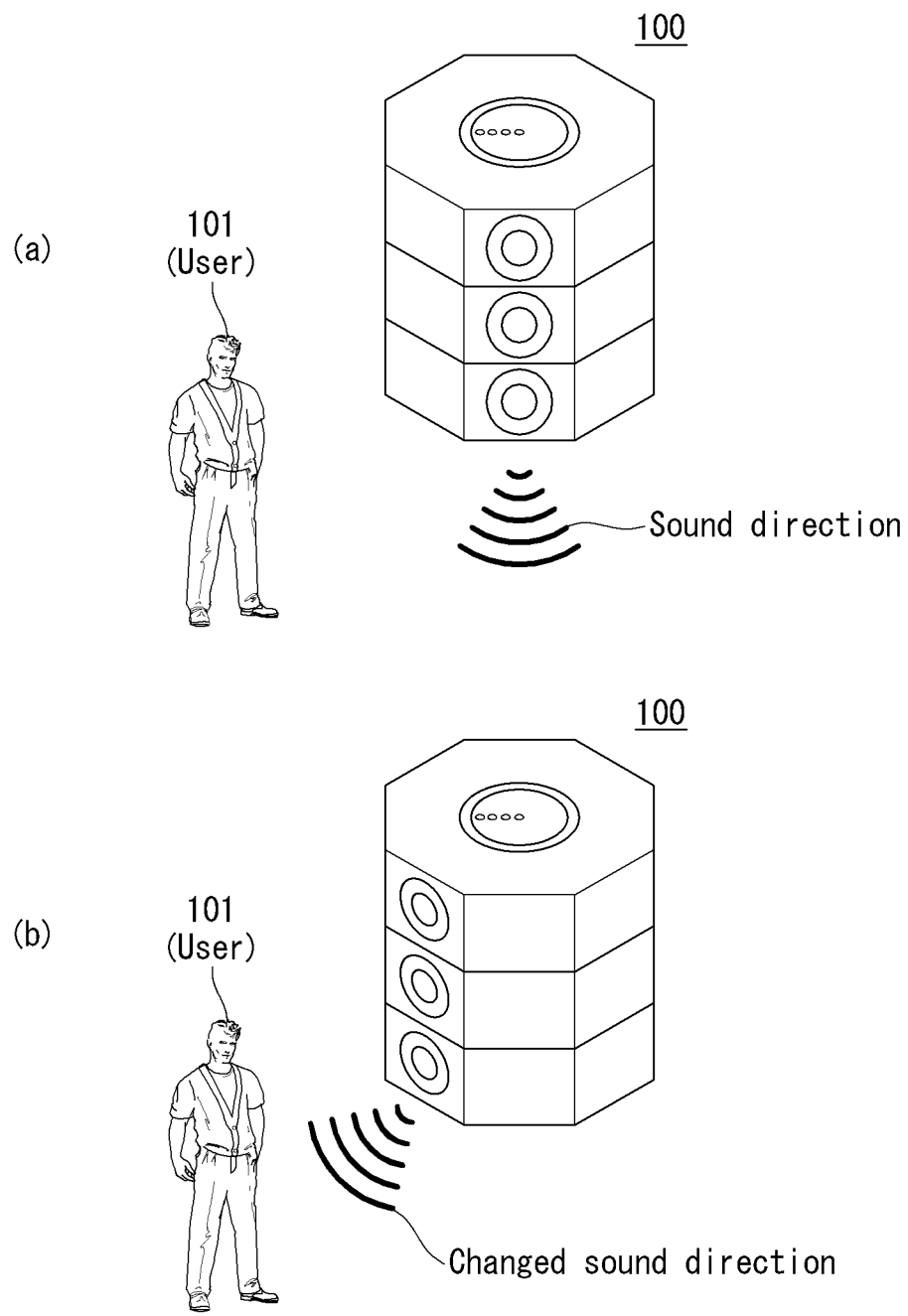
FIG. 22 illustrates a function for changing a sound direction based on the position of a user in a sound output device according to the present invention.

FIG. 22 illustrates a function for changing a sound direction based on the position of a user in a sound output device 100 according to the present invention.

FIG. 22(*a*) illustrates a situation where the sound output device 100 recognizes the user 100 in the front left of the sound output device while the sound output device 100 is oriented to the front. Then the sound output device 100 can change its sound direction to be directed to the user 101 as shown in FIG. 22(*b*).

To implement the operation of changing a sound direction, the sound output device 100 has to include a sensing unit for sensing the position of the user 101 and a driving unit (not shown) for changing the sound direction of the sound output device 100. Position sensing of the user 101 can be realized by such techniques as using infrared sensing, positioning based on ultrasound waves, or positioning based on images captured through a camera.

Meanwhile, the controller 200 may change only the sound directions of part of a plurality of sub-sound outputting devices included in the sound output device 100 based on the position of the user.

Figure 23:
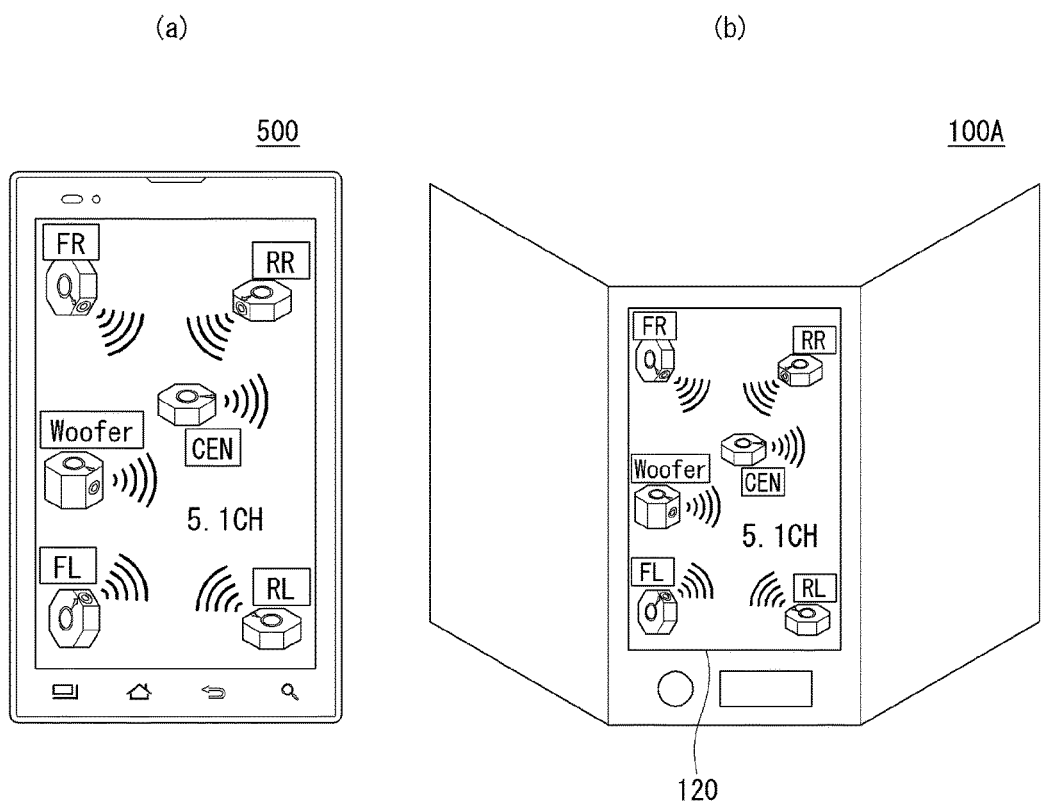
FIG. 23 illustrates examples of a method for providing information of a sound output device according to the present invention.

FIG. 23 illustrates examples of a method for providing information of a sound output device 100 according to the present invention. More specifically, FIG. 23 illustrates a case where information about the sound output device 100 is provided through a smartphone 500 which is a different electronic device coupled to the sound output device 100. The different electronic device can be coupled to the sound output device 100 through a short range wireless communication network.

With reference to FIG. 23(*a*), the smartphone 500 provides information about a sound channel established for the sound output device 100 and the roles of a plurality of sub-sound outputting devices in the established sound channel. Though not shown in the figure, the controller may provide various control functions for the sound output device 100 through the smartphone 500.

With reference to FIG. 23(*b*), the display unit 120 prepared in the woofer 100A of the sound output device 100 can provide information about a sound channel established for the sound output device and roles of the plurality of sub-sound outputting devices in the established sound channel. The controller 200 may provide a control function for the sound output device 100 through the display unit 120 implemented in the form of a touch screen.

Figure 24:
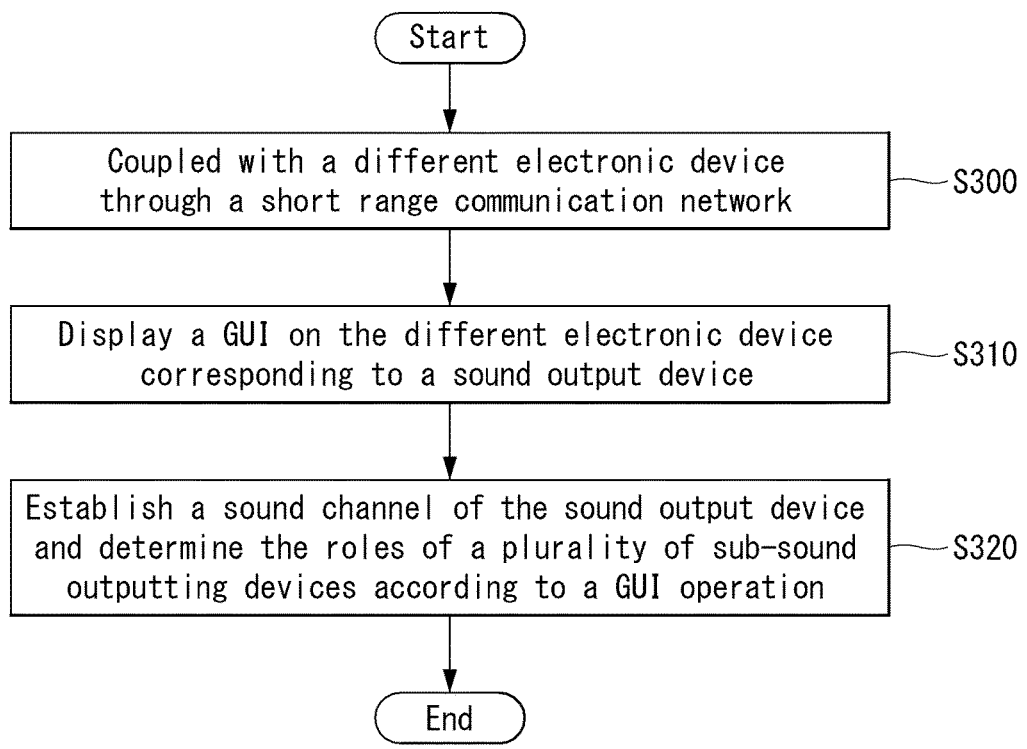
FIG. 24 illustrates another example of a method for driving a sound output device according to the present invention.

FIG. 24 illustrates another example of a method for driving a sound output device according to the present invention. In what follows, the method for driving a sound output device will be described with reference to related drawings.

First, the sound output device 100 is coupled to a different electronic device through a short range communication network S300. Then the sound output device 100 and the different electronic device transmits and receives sound-related information to and from each other.

Then the controller 200 displays a graphic user interface for the sound output device on the different electronic device S310. Then the controller 200 establishes a sound channel of the sound output device 100 on the basis of the operation on the graphic user interface and assigns the respective roles of the plurality of sub-sound outputting devices in the sound channel established in the sound output device S320. Meanwhile, the controller 200 may automatically determine the individual roles of the plurality of sub-sound outputting devices within the established sound channel on the basis of the respective sound directions of the plurality of sub-sound outputting devices.

Meanwhile, a different electronic device may only perform delivering passive information like providing information about a sound channel established for the sound output device 100; and providing position information of the plurality of sub-sound outputting devices and information about the roles of the plurality of sub-sound outputting devices in the established sound channel.

Figure 25:
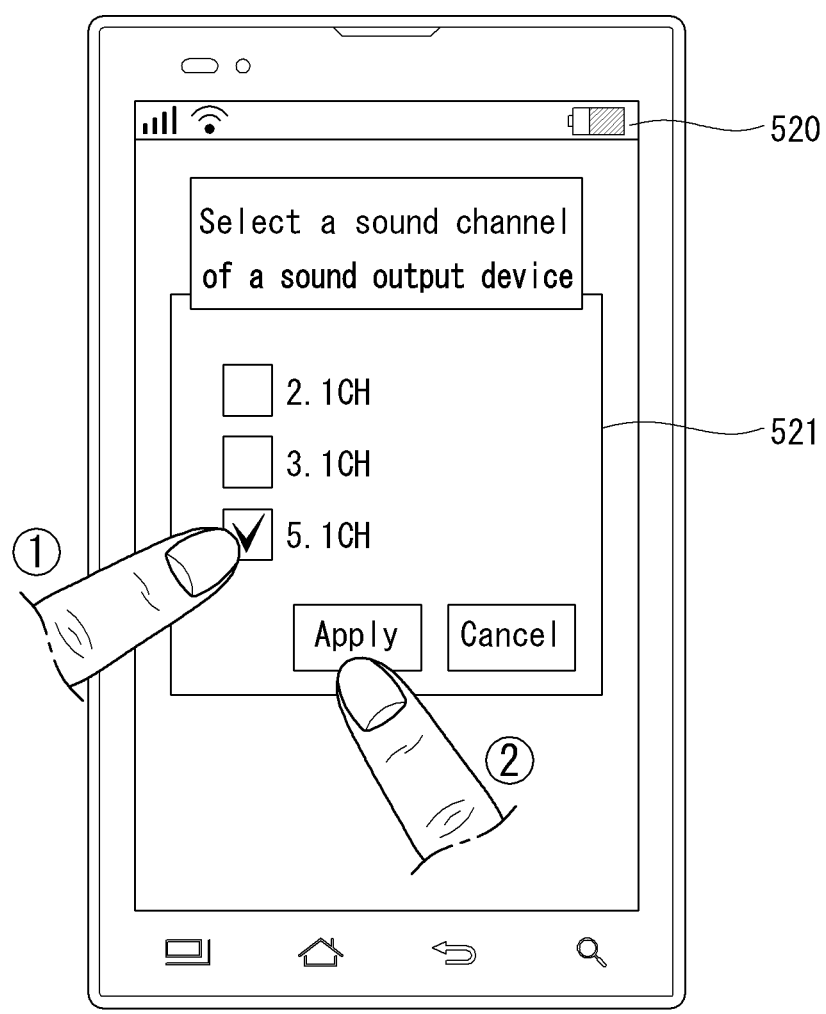
FIG. 25 illustrates an example where a GUI for configuring a sound channel of a sound output device according to the present invention is provided through a smartphone coupled with the sound output device according to a method for driving a sound output device shown in FIG. 24.

FIG. 25 illustrates an example where a GUI for configuring a sound channel of a sound output device 100 according to the present invention is provided through a smartphone coupled with the sound output device 100 according to a method for driving a sound output device shown in FIG. 24.

Through a touch input on the GUI 521, the user can configure a sound channel for the sound output device 100. Meanwhile, candidate sound channels provided through the GUI 521 may be a plurality of sound channels that can be realized through the sound output device 100. The plurality of sound channels may be those recommended based on how the plurality of sub-sound outputting devices are combined and disposed.

Meanwhile, the controller 200 may determine the roles of the plurality of sub-sound outputting devices within the determined sound channel on the basis of the respective sound directions of the plurality of sub-sound outputting devices.

FIG. 26 illustrates an example where a GUI 522 for determining the roles of a plurality of sub-sound outputting devices of a sound output device 100 according to the present invention is provided through a smartphone 500 coupled with the sound output device 100 according to a method for driving a sound output device shown in FIG. 24.

The user can determine disposed position of a sub-sound output device selected through a touch and drag operation with respect to a plurality of sub-sound outputting devices displayed on the GUI 522. The selected sub-sound output device can be disposed by the user at the disposed position afterwards. Meanwhile, the controller 200 can determine the role of the selected sub-sound output device within the sound channel established for the sound output device 100 on the basis of the disposed position.

Figure 27:
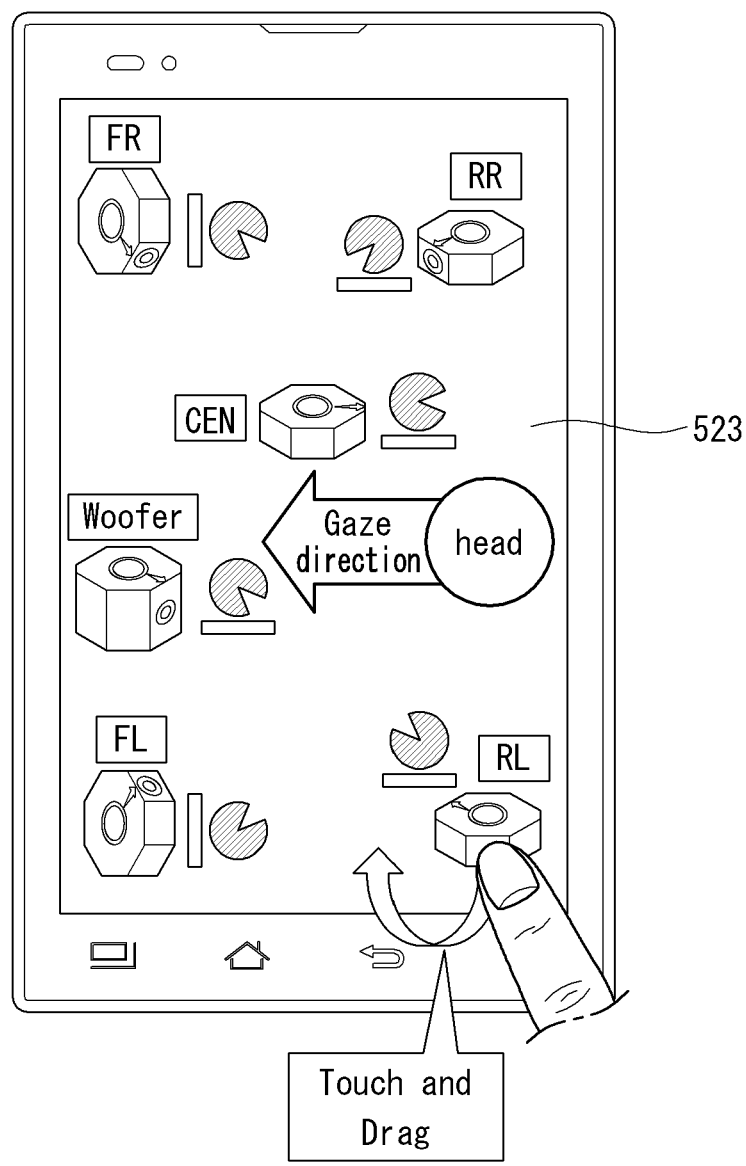
FIG. 27 illustrates an example where a GUI for controlling a sound direction of sub-sound outputting devices of a sound output device according to the present invention is provided through a smartphone coupled with the sound output device.

FIG. 27 illustrates an example where a GUI 523 for controlling a sound direction of sub-sound outputting devices of a sound output device according to the present invention is provided through a smartphone 500 coupled with the sound output device.

With reference to FIG. 27, the user can change the sound direction of a sub-sound output device selected through a touch and drag operation with respect to a plurality of sub-sound outputting devices displayed on the GUI 523. At this time, the sound output device 100 has to include a driving unit through which sound directions of the plurality of sub-sound outputting devices can be changed.

Meanwhile, in case the respective sound directions of the plurality of sub-sound outputting devices are changed through the GUI 523 while the plurality of sub-sound outputting devices are coupled to each other, the controller 200 may determine the roles of the plurality of sub-sound outputting devices within the established sound channel on the basis of the changed sound directions.

Figure 28:
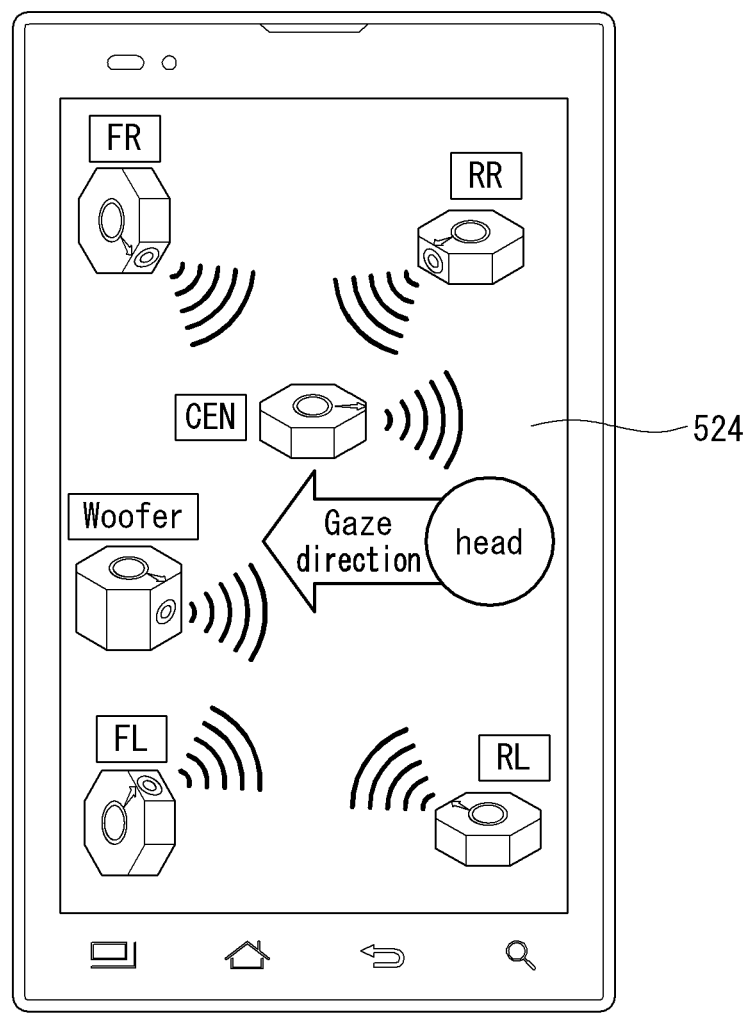
FIG. 28 illustrates an example where a GUI for providing a sound field of sub-sound outputting devices of a sound output device according to the present invention is provided through a smartphone coupled with the sound output device.

FIG. 28 illustrates an example where a GUI 524 for providing a sound field of sub-sound outputting devices of a sound output device according to the present invention is provided through a smartphone 500 coupled with the sound output device.

With reference to FIG. 28, sound field effects for a plurality of sub-sound outputting devices are provided through the GUI 524 based on the respective sound directions. As described with reference to FIG. 27, in case sound directions of the plurality of sub-sound outputting devices are changed, the corresponding sound field effects can be changed accordingly.

Figure 29:
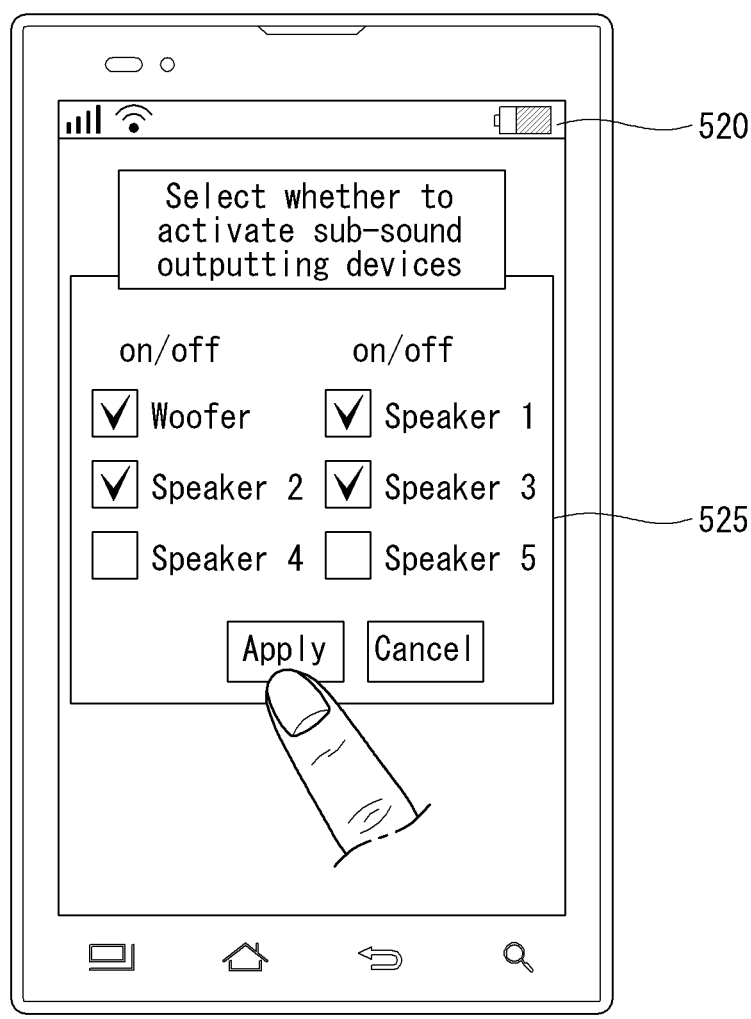
FIG. 29 illustrates an example where a GUI for controlling whether to activate sub-sound outputting devices of a sound output device according to the present invention is provided through a smartphone coupled with the sound output device.

FIG. 29 illustrates an example where a GUI 525 for controlling whether to activate sub-sound outputting devices of a sound output device according to the present invention is provided through a smartphone coupled with the sound output device.

With reference to FIG. 29, the user can control whether to activate the plurality of sub-sound outputting devices on the basis of the operation through the graphic user interface 525.

Figure 30:
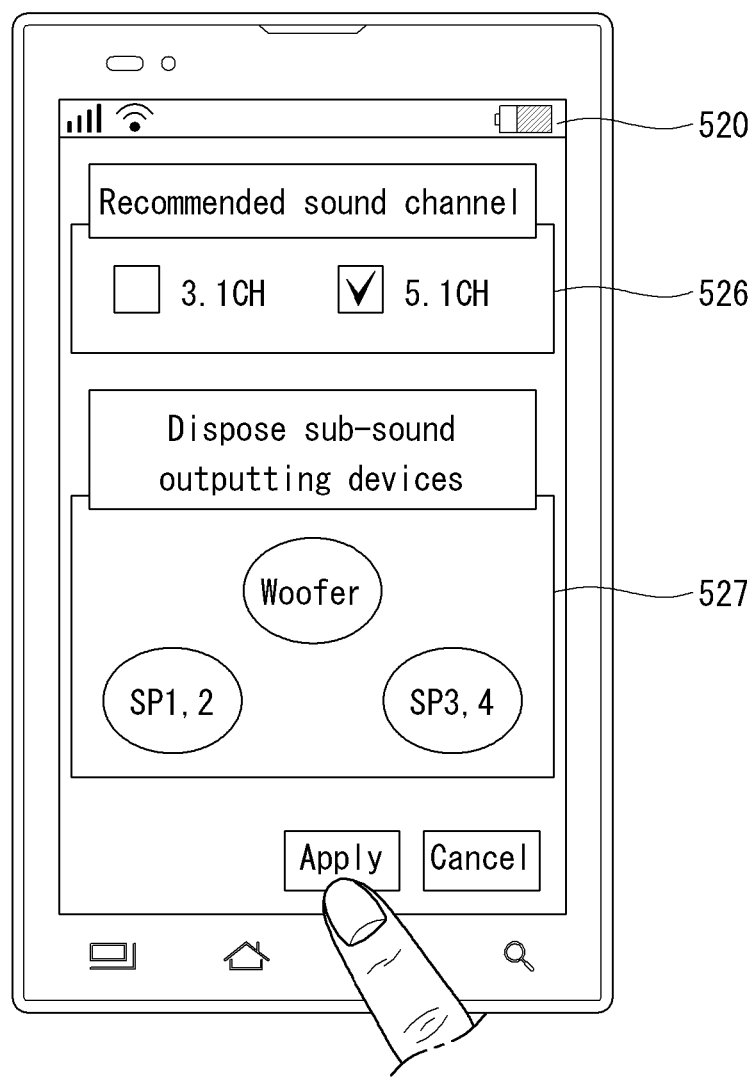
FIG. 30 illustrates an example where a GUI for providing a recommended sound channel by using sub-sound outputting devices of a sound output device according to the present invention is provided through a smartphone coupled with the sound output device.

FIG. 30 illustrates an example where a GUI 526 for providing a recommended sound channel by using sub-sound outputting devices of a sound output device according to the present invention is provided through a smartphone 500 coupled with the sound output device.

With reference to FIG. 30, the user can select one of recommended sound channels through a touch input on the GUI 526. Meanwhile, the recommended sound channel can be determined based on how the plurality of sub-sound outputting devices are combined and disposed. As shown in FIG. 30, the controller 200 of the sound output device 100 may further provide a GUI 527 for the smartphone 500, which provides information about how a plurality of sub-sound outputting devices are disposed.

Figure 31:
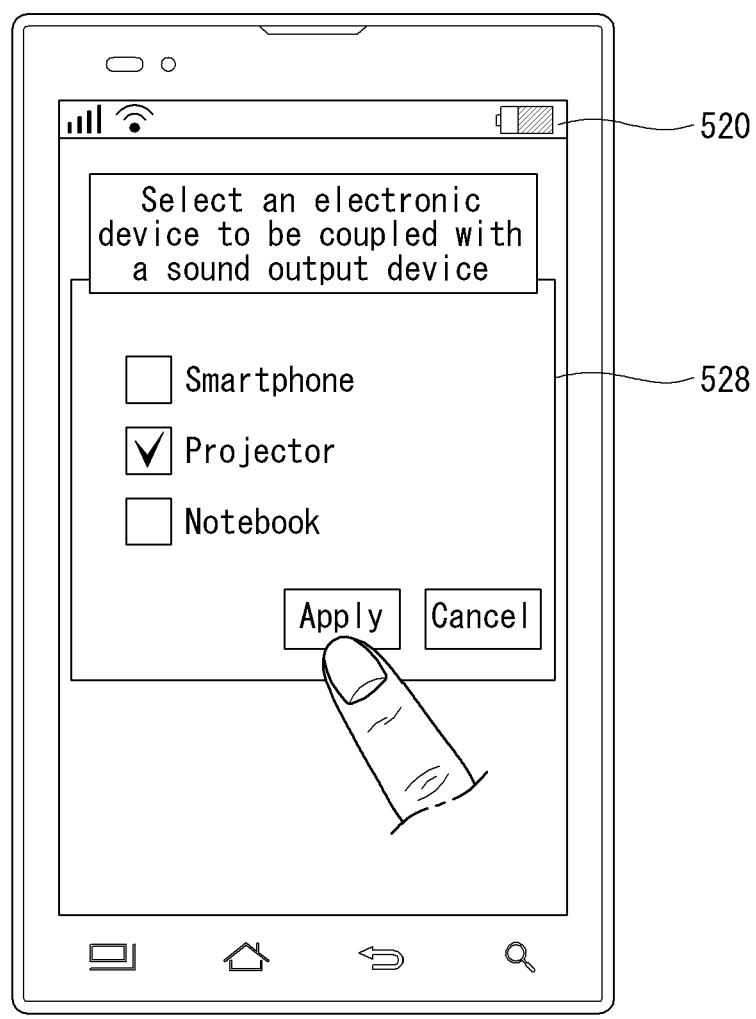
FIG. 31 illustrates an example where a GUI for selecting a different electronic device to be associated with a sound output device according to the present invention is provided through a smartphone coupled with the sound output device.

FIG. 31 illustrates an example where a GUI 528 for selecting a different electronic device to be associated with a sound output device according to the present invention is provided through a smartphone 500 coupled with the sound output device.

With reference to FIG. 31, the user can select an electronic device which outputs a sound signal through the sound output device 100 from among different electronic devices coupled to the sound output device 100 through a touch input on the GUI 528. Meanwhile, the different electronic devices can exchange related information with the sound output device 100 by performing short range wireless communication with the sound output device 100.

Each of the methods for driving a sound output device according to the present invention described above can be recorded in a computer-readable recording medium in a form of an executable program through various computer means. The computer-readable recording medium can include program commands, data files, and data structures separately or in a combined form. Programs recorded in the medium may be those specially designed and prepared for the present invention or those well-known to those skilled in the art of computer software.

Examples of a computer-readable recording medium include magnetic media such as hard disks, floppy disks, and magnetic tapes; optical media such as CD-ROM and DVD; magneto-optical media such as floptical disks; and hardware devices specially designed for storing and running program commands such as ROM, RAM, and flash memory. Examples of a program include high-level codes that can be executed by a computer through an interpreter as well as machine codes generated by a compiler. The hardware devices above can be composed to operate as one or more software modules to perform the operations of the present invention and vice versa.

Though the present invention has been described with a limited number of embodiments and drawings, the present invention is not limited to the embodiments above, and it should be understood by those skilled in the art to which the present invention belongs that various modifications and changes can be made from the descriptions of this document.

Therefore, the technical scope of the present invention should not be limited by those embodiments described above, but defined by the appended claims and equivalents thereof.

The invention claimed is:

1. A sound output device, comprising:
   a plurality of sub-sound outputting devices that are vertically connected to be mutually rotatable and are connected to each other electrically or through a short range communication network;
   a driving unit capable of rotating each of the plurality of sub-sound outputting devices;
   a wireless communication unit being coupled with a different electronic device through the short range communication network; and
   a controller configured to:
      be mounted at one of the plurality of sub-sound outputting devices,
      determine a type of a sound channel to realize how the plurality of sub-sound outputting devices are combined and disposed,
      determine roles of the plurality of sub-sound outputting devices in the determined sound channel,
      receive, from the different electronic device, a signal for selecting at least one of the plurality of sub-sound outputting devices and for changing a sound direction of the selected at least one sub-sound outputting device,
      rotate each of the selected at least one sub-sound outputting device based on the received signal to change the sound direction of the selected at least one sub-sound outputting device, and
      set the respective roles of the plurality of sub-sound outputting devices in the sound channel determined for the sound output device based on the changed sound direction.

2. The sound output device of claim 1, wherein the controller is configured to determine the roles of the plurality of sub-sound outputting devices in the determined sound channel based on the respective sound directions of the plurality of sub-sound outputting devices.

3. The sound output device of claim 1, wherein, in case a different sound output device that can be coupled with the sound output device is connected electrically or through a short range wireless communication network, the controller is configured to change the type of the sound channel to be implemented and to adjust the roles of the plurality of sub-sound outputting devices and the different sound output device in the changed sound channel.

4. The sound output device of claim 1, wherein, in case a sub-sound outputting devices, from among the plurality of sub-sound outputting devices, is disconnected, the controller is configured to change the type of the sound channel to be implemented and to adjust the roles of the plurality of sub-sound outputting devices in the changed sound channel.

5. The sound output device of claim 1, further comprising:
   a sensing unit for sensing a user's position,
   wherein the controller is configured to change at least one sound direction of the plurality of sub-sound outputting devices based on the detected position of the user.

6. The sound output device of claim 1, further comprising a display unit,
   wherein the display unit is configured to be mounted in one of the plurality of sub-sound outputting devices and to provide information about a sound channel established for the sound output device and information about the roles of the plurality of sub-sound outputting devices in the established sound channel.

7. The sound output device of claim 1, wherein the controller is configured to provide information about a sound channel set with respect to the sound output device and information about the roles of the plurality of sub-sound outputting devices in the sound channel through a different electronic device coupled with the sound output device through a short range communication network.

8. The sound output device of claim 1, wherein the controller is configured to:
   control the different electronic device to provide a graphic user interface for the sound output device.

9. The sound output device of claim 8, wherein the graphic user interface is configured to provide information about a sound channel determined for the sound output device and information about the positions of the plurality of sub-sound outputting devices.

10. The sound output device of claim 8, wherein the controller is configured to control whether to activate the plurality of sub-sound outputting devices based on the operation on the graphic user interface.

11. The sound output device of claim 8, wherein the controller is configured to provide recommended sound channel information corresponding to the sound output device through a graphic user interface provided through the different electronic device based on how the plurality of sub-sound means are combined and disposed.

12. The sound output device of claim 8, wherein the controller is configured to provide a graphic user interface for selecting an electronic device supposed to provide a sound signal in association with the sound output device through the different electronic device.

* * * * *